United States Patent
Muizelaar et al.

(10) Patent No.: US 6,811,067 B2
(45) Date of Patent: Nov. 2, 2004

(54) VEHICLE TAILGATE WITH STORAGE CAPACITY

(75) Inventors: Richard D. Muizelaar, Mississauga (CA); Noel Mack, Newmarket (CA)

(73) Assignee: Magna International Inc., Aurora (CA)

(*) Notice: Subject to any disclaimer, the term of this patent is extended or adjusted under 35 U.S.C. 154(b) by 102 days.

(21) Appl. No.: 10/203,602

(22) PCT Filed: Feb. 12, 2001

(86) PCT No.: PCT/CA01/00152

§ 371 (c)(1),
(2), (4) Date: Aug. 12, 2002

(87) PCT Pub. No.: WO01/58742

PCT Pub. Date: Aug. 16, 2001

(65) Prior Publication Data

US 2003/0000980 A1 Jan. 2, 2003

Related U.S. Application Data

(60) Provisional application No. 60/181,650, filed on Feb. 10, 2000, and provisional application No. 60/243,058, filed on Oct. 25, 2000.

(51) Int. Cl.[7] .................................................. B60R 7/00
(52) U.S. Cl. ........................ 224/404; 224/497; 224/505; 296/37.6; 296/57.1; 296/61; 414/537
(58) Field of Search .................. 224/402, 403, 224/404, 282, 488, 496, 497, 502, 504, 505, 506, 507, 508, 527, 543, 544; 296/37.1, 37.6, 57.1, 50, 51, 61, 37.13; 414/537; 14/71.7, 69.5

(56) References Cited

U.S. PATENT DOCUMENTS

| 3,642,156 | A |   | 2/1972  | Stenson |         |
|-----------|---|---|---------|---------|---------|
| 4,668,002 | A |   | 5/1987  | Hanson  |         |
| 4,864,673 | A |   | 9/1989  | Adaway  |         |
| 5,062,174 | A | * | 11/1991 | DaSalvo | 14/69.5 |
| 5,156,432 | A | * | 10/1992 | McCleary | 296/61 |
| 5,211,437 | A |   | 5/1993  | Gerulf  |         |
| 5,244,335 | A |   | 9/1993  | Johns   |         |
| 5,273,335 | A | * | 12/1993 | Belnap et al. | 296/61 |
| 5,342,105 | A |   | 8/1994  | Miles   |         |
| 5,518,158 | A |   | 5/1996  | Matlack |         |
| 5,518,288 | A |   | 5/1996  | Deklotz |         |
| 5,536,058 | A | * | 7/1996  | Otis    | 296/61  |
| 5,540,474 | A |   | 7/1996  | Holland |         |
| 5,597,195 | A | * | 1/1997  | Meek    | 296/61  |
| 5,791,717 | A | * | 8/1998  | Reich et al. | 296/61 |
| 5,803,523 | A |   | 9/1998  | Clark   |         |
| 6,119,634 | A | * | 9/2000  | Myrick  | 119/847 |
| 6,139,249 | A | * | 10/2000 | Lucht   | 414/537 |
| 6,199,930 | B1 | * | 3/2001 | Riley   | 296/37.6 |
| 6,322,125 | B2 | * | 11/2001| Bauer   | 296/57.1 |
| 6,430,769 | B1 | * | 8/2002 | Allen   | 14/69.5  |

FOREIGN PATENT DOCUMENTS

| DE | 3 108 293  |   | 3/1981 |
| GB | 2 058 996 A |  | 8/1980 |
| GB | 2 213 463 A |  | 1/1989 |

* cited by examiner

Primary Examiner—Stephen K. Cronin
(74) Attorney, Agent, or Firm—Clark Hill PLC

(57) ABSTRACT

A vehicle for storing and transporting cargo comprises a cargo box for supporting and storing the cargo in the vehicle. The cargo box includes a planar cargo floor extending between a front end and a rear open end and laterally between a pair of spaced apart and parallel side walls of the cargo boy. A tailgate (12) is pivotally connected to the cargo box and pivotal between an open position extending from the cargo floor for providing access to the cargo box and a generally upright closed position for closing the cargo boy. The tailgate includes a cavity (24) recessed in the tailgate and a door (18) for closing the cavity in the tailgate. Items such as ramps which are usable, with the tailgate in the open position, to load cargo into the box, are stowable within the tailgate cavity. Such ramps can also be arranged in a fence like manner to form a cargo box extender.

8 Claims, 20 Drawing Sheets

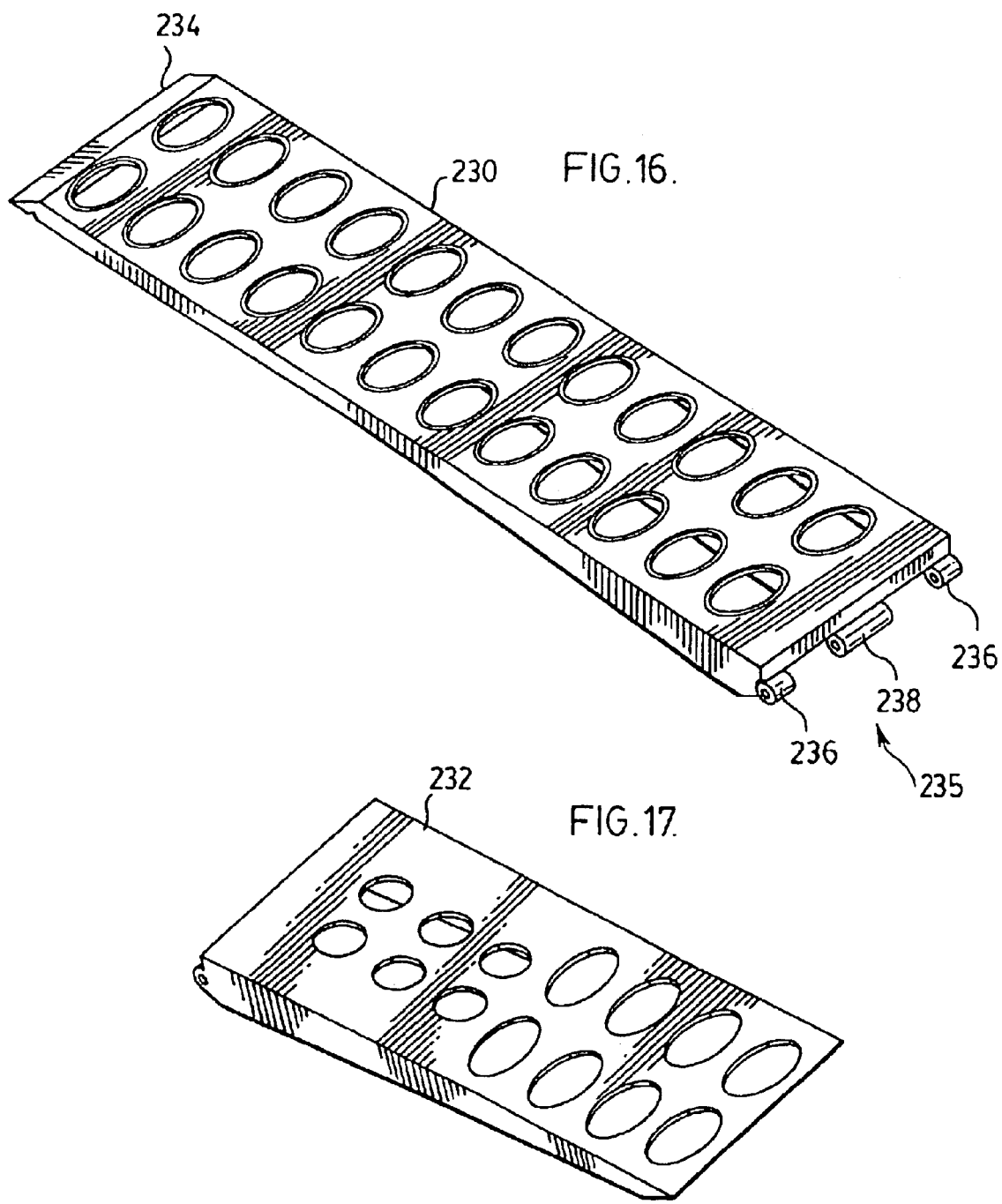

VEHICLE TAILGATE WITH STORAGE CAPACITY

This application claims the benefits of provisional applications No. 60/181,650, field Feb. 10, 2000, and No. 60/243,058, filed Oct. 25, 2000.

FIELD OF THE INVENTION

The present invention relates generally to a vehicle tailgate which has storage capacity.

BACKGROUND OF THE INVENTION

Automotive vehicles such as pick-up trucks, sport utility vehicles and vans typically include a cargo box defined by a generally rectangular area of the vehicle having a cargo floor, opposing side walls and a rear tailgate pivotally connected to the cargo floor. The tailgate may be pivoted about the cargo floor between an open position providing access to the cargo box area and a closed position, latched to the side walls, for closing the cargo box.

Some vehicles are provided with a cover to completely enclose the cargo box for items to be carried in the box. These covers may have either a soft or a hard construction. The soft covers are not completely weather proof and can be easily infiltrated. The hard covers can be quite costly. Furthermore, the items to be carried may not be of a size to justify a complete coverage of the cargo box and it may be desirable to leave the top of the box open to carry larger items which extend above the height permitted by a full cover.

The height or distance from the ground to the cargo floor or tailgate often presents difficulties in loading cargo into the vehicle and cargo box. Many large sized vans or trucks such as "moving" trucks, include an elongated ramp which may be attached to the rear of the vehicle or cargo floor adjacent the opening to the cargo box and extended between the cargo floor and the ground to assist the vehicle occupant in loading the cargo box. However, storage of the ramp remains difficult due to the size of the ramp which must be long enough to provide a usable ramp angle for moving objects into and out of the cargo box. After use, the ramps are usually placed in the cargo box and in many instances because of their long length they extend out of the box. Furthermore, these known ramps must be very strong, which usually means they are also heavy, for loading the cargo box with larger items such as motorcycles, all terrain vehicles, etc. Again this makes the known ramps awkward to handle.

SUMMARY OF THE PRESENT INVENTION

The present invention relates to a vehicle for storing and transporting cargo comprising a cargo box for supporting and storing the cargo in the vehicle. The cargo box is defined by a generally planar cargo floor extending between a front end and a rear open end of the box and a pair of spaced apart and generally parallel side walls extending between the front end and the rear open end along opposing sides of the cargo floor. A tailgate is operatively connected to the rear open end of the cargo box and pivotal between an open position extending from the cargo floor, generally planar therewith for providing access to the cargo box and a closed position extending generally upright from the rear open end of the cargo floor between the opposing side walls for closing the cargo box. According to the present invention the tailgate includes an item storage cavity and a door for closing the cavity in the tailgate.

According to an aspect of the invention there is provided a stowable ramp assembly for a vehicle including a first ramp member having a first support surface and a wedge shaped profile. The first member has a leading end having an end wall extending from the first support surface. A pin extends transversely of the first member and is spaced from the first support surface. A second ramp member has a second support surface and a wedge shaped profile. The second member is configured to nest within the first member when in a front to back relation. The second member has a trailing end having an end wall extending from the second support surface and a hook extending longitudinally from the trailing end at a point spaced from the second support surface. The first and second members interconnect in a ramp configuration by engaging the hook about the pin and rotating one of the members relative to the other of the members until the leading end wall abuts with the trailing end wall presenting an elongate support surface. A first set of the first and second members store in a nested configuration with a second sets of the first and second ramp members also in a nested configuration. The first and second set are presented to each other in opposing directions to minimize the stack height of the ramp members.

According to another aspect of the invention there is provided a well in a vehicle for storing a first set and a second set of ramp members. The storage well has a cover for selectively covering and closing the well. The well is sized to receive the first set of first and second members in a nested configuration and also a second set of first and second members again in a nested configuration. The first and second sets of ramp members are presented to each other in opposing directions.

According to a further aspect of the invention the well in the vehicle for storing the first and second sets of first and second ramp members is provided in the tailgate storage cavity.

According to yet a further embodiment of the present invention at least one elongated extension ramp is stowable within the tailgate cavity. The extension ramp includes a first end for connecting the ramp to the tailgate and a second end for supporting the ramp on a surface adjacent the vehicle whereby the ramp provides a gradual inclined extension support surface from the surface adjacent the vehicle to the tailgate for loading cargo into the cargo box.

BRIEF DESCRIPTION OF THE DRAWINGS

In drawings which illustrate the embodiments of the present invention.

FIG. 16 is a perspective view of the top side of a ramp member according to a further embodiment of the invention;

FIG. 17 is a perspective view of the top side of another ramp member according to an embodiment of the invention;

DETAILED DESCRIPTION ACCORDING TO THE PREFERRED EMBODIMENTS OF THE PRESENT INVENTION IN WHICH

Figure 1:
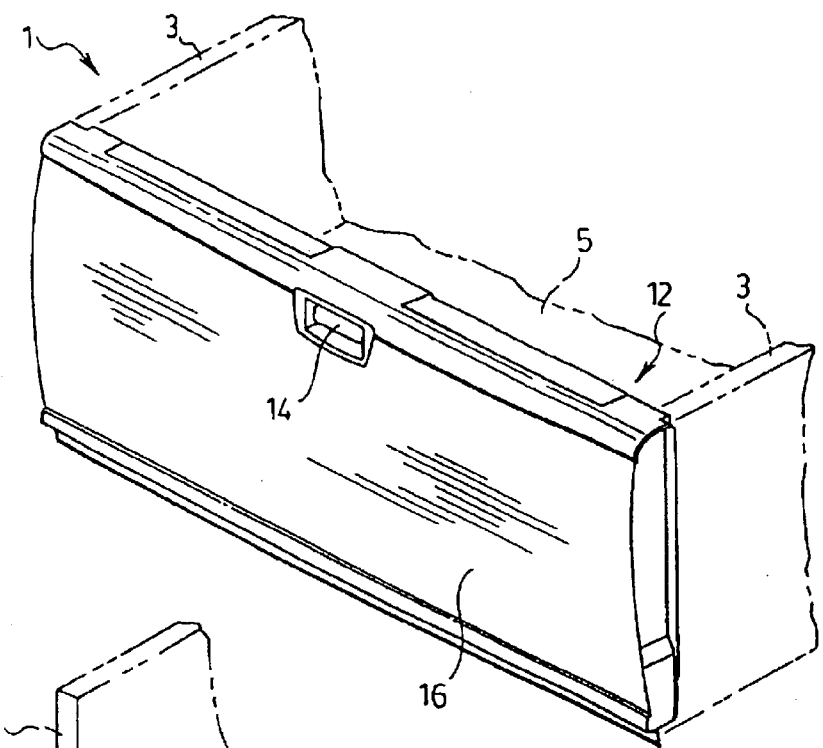
FIG. 1 is a perspective view of a tailgate of the present invention in the closed position.
Figure 2:
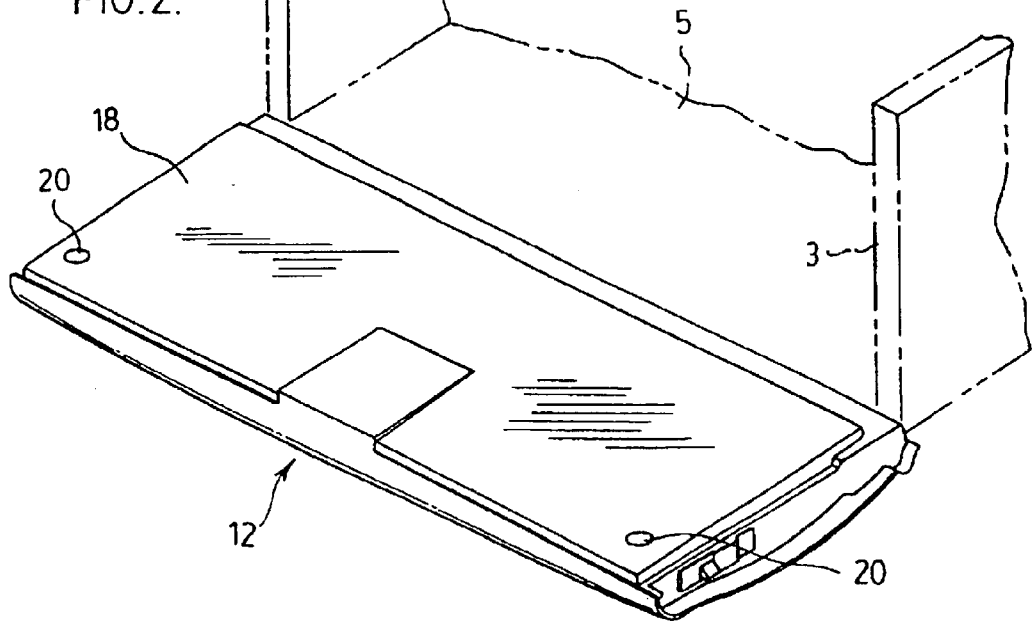
FIG. 2 is a perspective view of the tailgate of FIG. 1, in an open position.

Referring to FIGS. 1 and 2, a tailgate 12 of the present invention is illustrated. Tailgate 12 is sized to pivotally mount to a conventional pick-up truck cargo box which is shown in dotted lines. This cargo box comprises box sidewalls 3 and cargo floor 5. Tailgate 12 pivotally connects with the lower edges of the sidewalls and pivots from a closed position (FIG. 1) to an open condition (FIG. 2) relative to the sidewalls of the cargo box. Conventional latches 23a (FIG. 3A) at the upper side edges selectively secure the tailgate 12 in the closed condition. Handle 14 is operatively connected to the latches to release the tailgate 12 in a manner well known in the art. Tailgate 12 comprises an outer rearwardly facing panel 16 and an inner cover 18. Panel 16 is spaced from cover 18 to define an inner storage cavity. Cover 18, which has a release handle 19 seen FIG. 3A, is hingedly mounted to the tailgate 12 at a lower inner edge thereof. Cover panel has loop locks 20 which assist in opening and closing the panel 18. Further handle 14 or the loop locks can include security locks to prevent unauthorized opening of cover 18.

Figure 3:
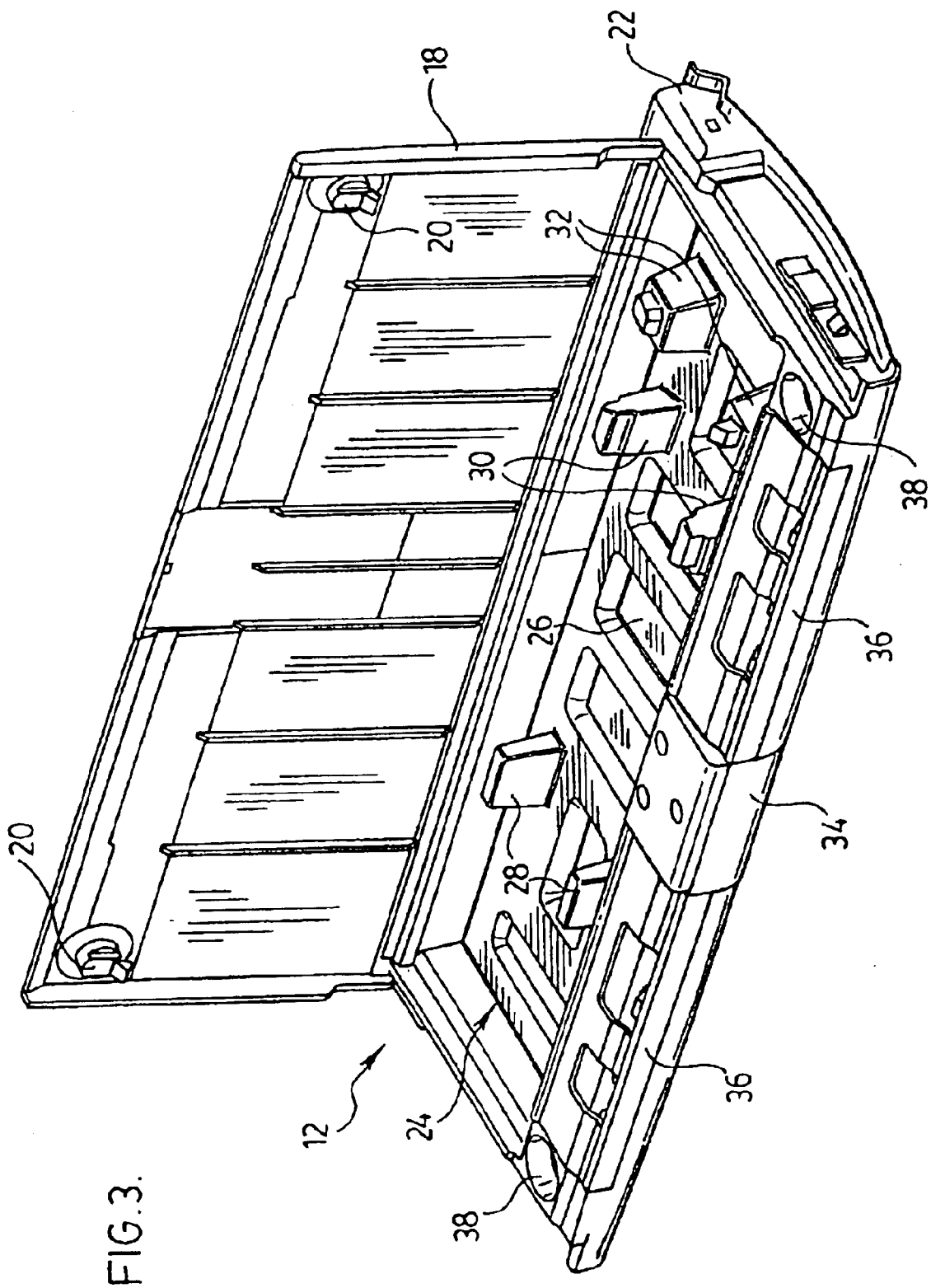
FIG. 3 is a perspective view of the tailgate of FIG. 1, with the cover plate open.
Figure 3A:
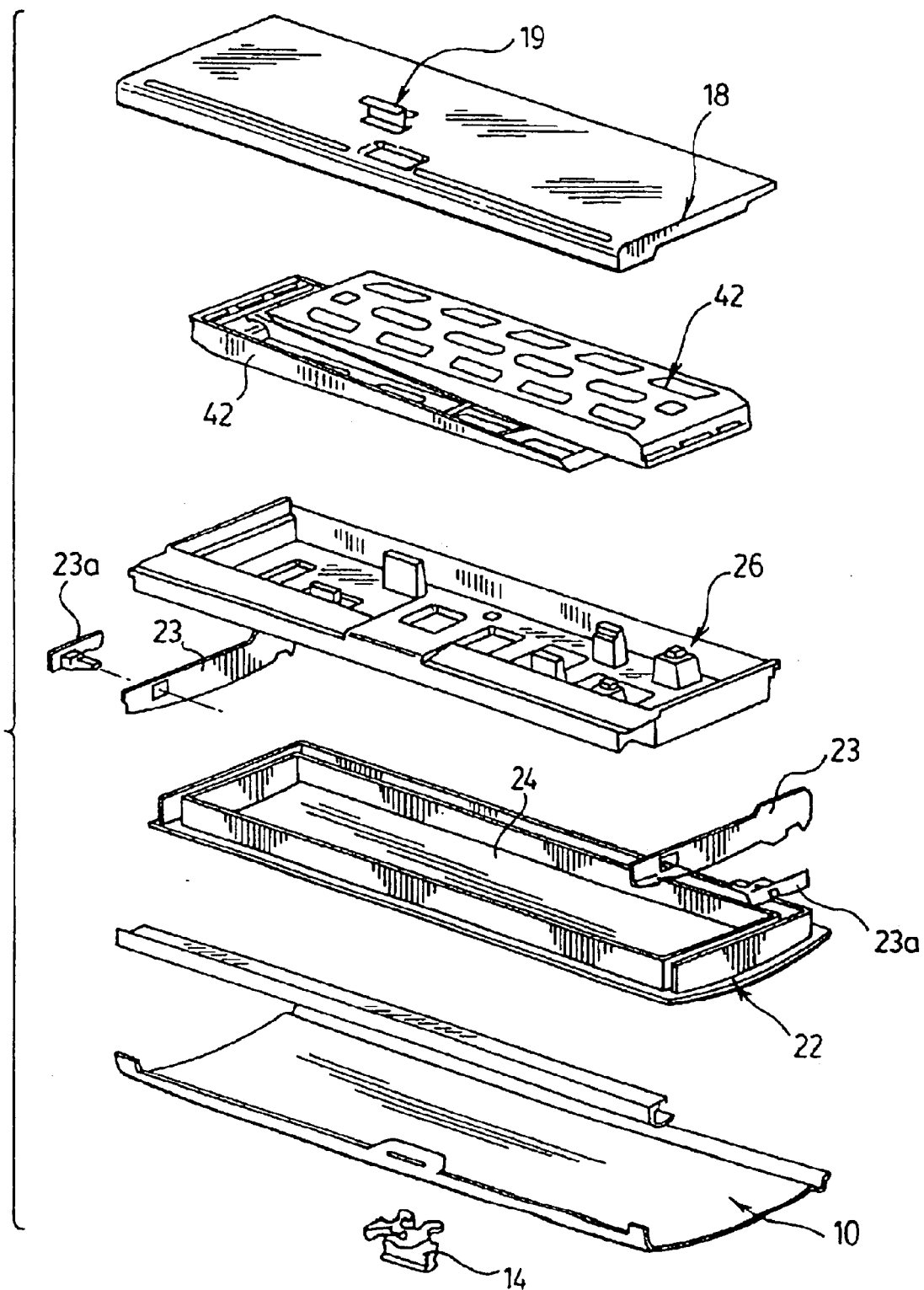
FIG. 3A is an exploded perspective view of the tailgate of FIG. 3 and additionally showing a pair of ramp members to be stored in the tailgate.

Referring to FIG. 3, the tailgate 12 is illustrated in the open condition. Tailgate 12 which is shown exploded in FIG. 3A has an outer perimeter frame structure 22. The frame structure 22 cooperates with the outer panel 16 to define an inner storage cavity or well 24. The well 24 has a liner 26. Liner 26 is preferably an injection molded component made of an organic plastic material. Liner 26 has a first pair of spacers 28, a second pair of spacers 30, and a third pair of spacers 32.

Hinge and latch reinforcements 23 are provided to opposite sides of the tailgate. Latch members 23a fit through the latch reinforcements.

Figure 3B:
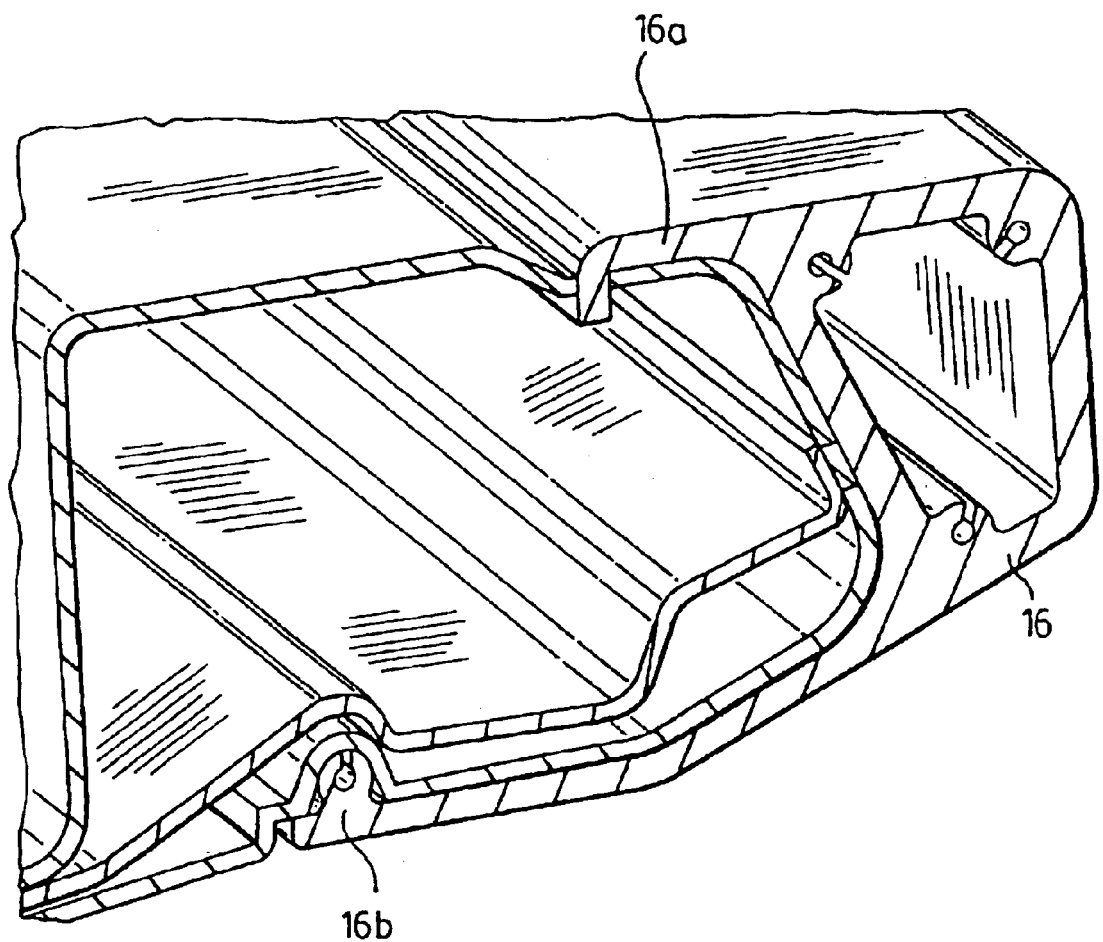
FIG. 3B is a sectional view through the tailgate of FIG. 3 in the closed position.

FIG. 3B shows that the assembly easily and efficiently locks together as a unit. The panel 16 includes interlocks 16a and 16b which secure exteriorly of the interior components to hold the assembly together.

Spacers 28 can be any suitable shape and have a height approximating the depth of the well 24. Similarly spacers 30 and 32 are similar in shape to the spacers 28 except that spacers 30 and 32 are slightly larger having a lip or flange surface spaced from the well floor. Spacers 28 and 30 are equally spaced from the side edges of the well 24 and the spacers 32 are intermediate spacers 30 and one of the side edges of the well 24. Spacers 28, 30 and 32 support the cover 18 when the cover 18 is in the closed condition.

The upper/trailing edge 34 of the frame structure 22 has a pair of flaps 36. Each flap 36 pivots between a closed position and an open position folded forwardly.

The upper/trailing edge 34 has a pair of recesses 38 which receive loop locks 20. Recesses 38 provide an edge which cooperates with the loop locks 20 to selectively retain the cover 18 in the closed condition.

Optionally and as illustrated in FIGS. 4–7, air struts 40 may be provided to extend between the cover 18 and the frame structure 22 to hold the cover 18 in the open condition.

Figure 4:
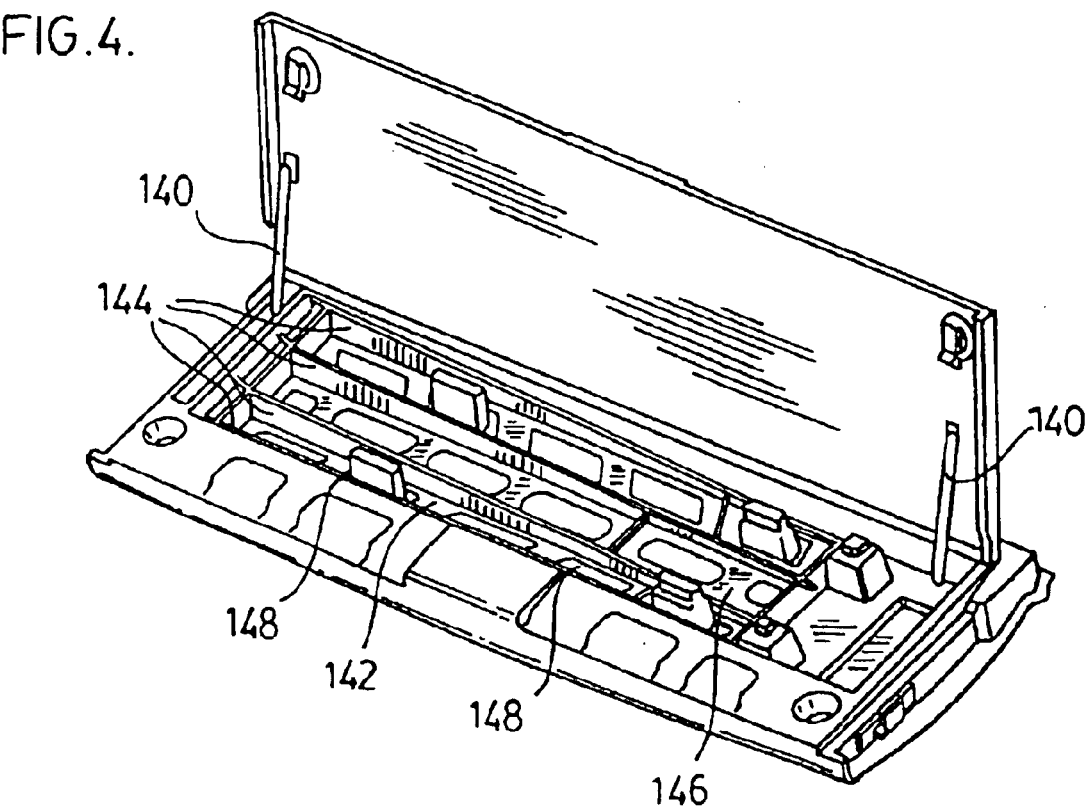
FIG. 4 is a perspective view of the tailgate of FIG. 1, with a first member of the ramp assembly stored therein.

Referring to FIG. 4, a first member 42 of the ramp assembly is illustrated in a face down condition. First member 42 has a generally rectangular shape in plan view. First member 42 has a series of ribs 44 which extend the length thereof. Ribs 44 taper in depth from a hinged end to a distal end. The hinged end has a depth approximating the depth of the well 24. Ribs 44 support a plate 46 which has a series of apertures 48 which are spaced to align with the spacers 28, 30. The hinged end of first member 42 is placed in the end opposite the spacers 32.

Figure 5:
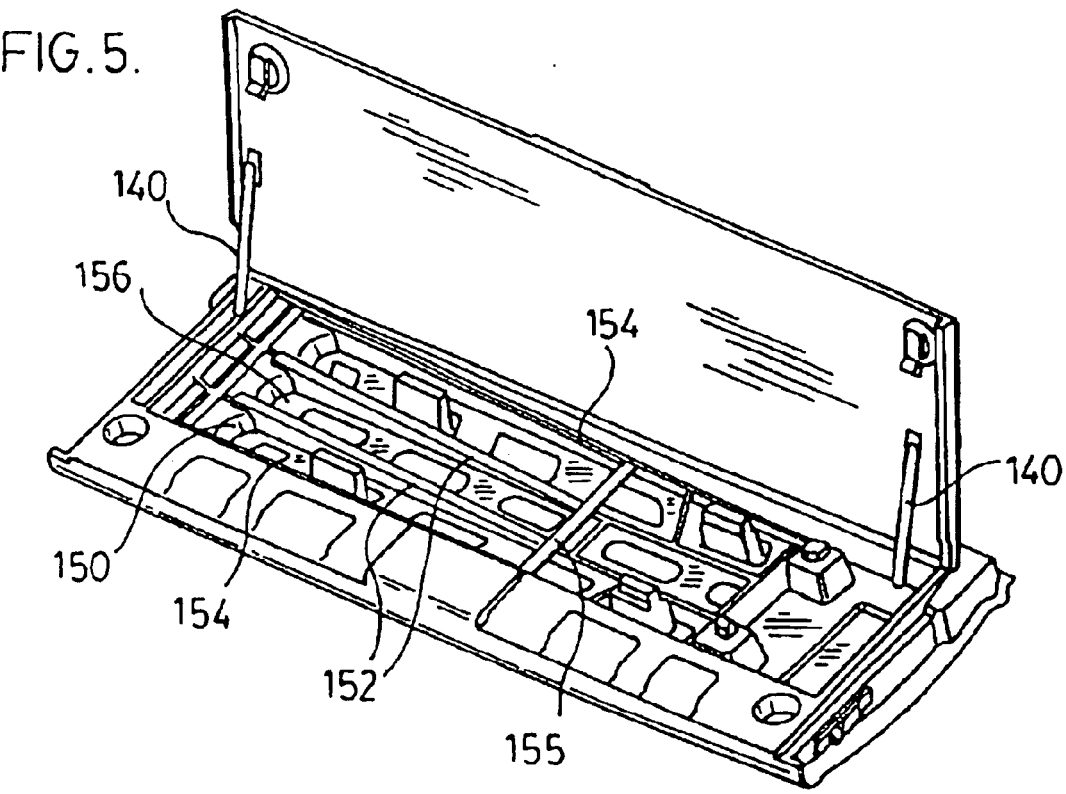
FIG. 5 is a perspective view of the tailgate of FIG. 1, with first and second members of the ramp assembly stored therein.

Referring to FIG. 5, a second member 50 of the ramp assembly is illustrated in a face down condition. Second member 50 has generally rectangular shape having a length less than the length of the first member 42 and a width slightly less than the width of the first member 42. Second member has a pair of archways 52 and ribs 54 extending longitudinally. Archway 52 and ribs 54 are tapered. A surface 56 interconnects the archways 52 and ribs 54. Surface 56 has a series of apertures, with at least two of the apertures align with the spacers 28. As illustrated, second member 50 is configured to nest within the first member 42 such that a hooked end of the second member 50 is adjacent the hinged end of the first member 42. The end opposite the hooked end has a lip 55.

Figure 6:
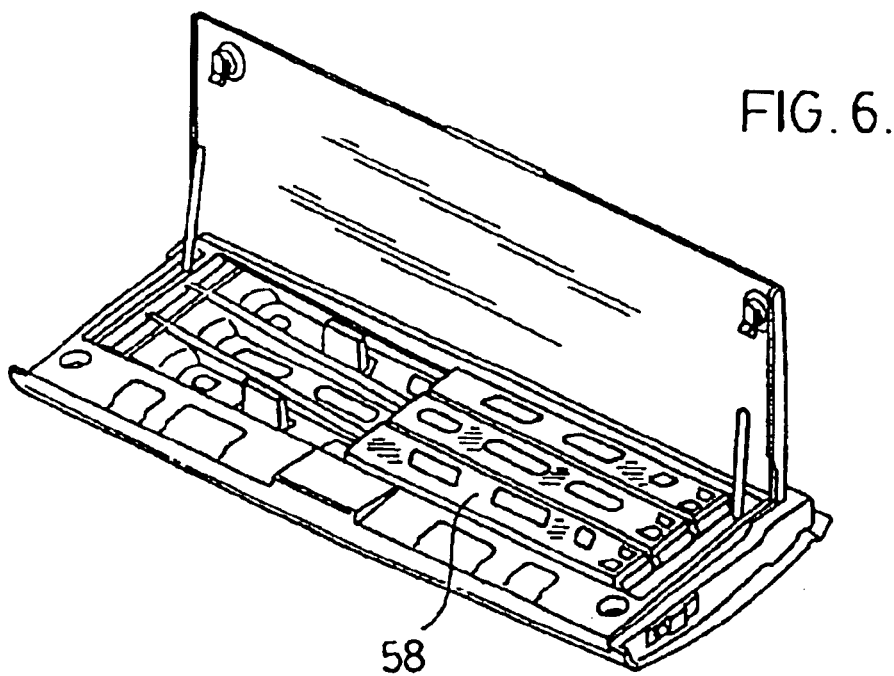
FIG. 6 is a perspective of the tailgate of FIG. 1, with first, second and third members of the ramp assembly stored therein.

Referring to FIG. 6, a third member 58 of the ramp assembly is illustrated in a face up condition. Third member is identical to second member 50 and positioned in a face to face relation therewith. Third member 58 is positioned to rest upon the lips or flanges of spacers 30 and 32. The aperture pattern is such that two are positioned to rest upon spacers 30 and two rest upon spacers 32.

Figure 7:
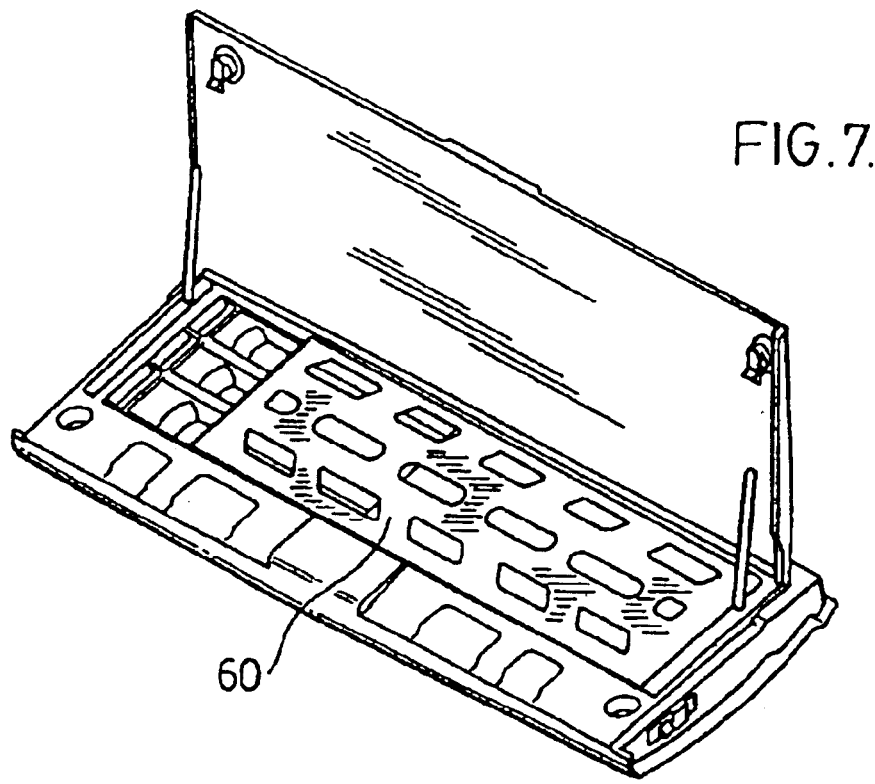
FIG. 7 is a perspective view of the tailgate of FIG. 1, with first, second, third and fourth members of the ramp assembly stored therein.

Referring to FIG. 7, the fourth member 60 of the ramp assembly is illustrated in a face up condition. The fourth member is identical to the first member 42. The fourth member will nest over top of the third member 58.

A feature of the invention which is specifically designed to help the nesting of the four ramp members is the configuration of the spacers 30 and 32 as earlier described. The location of the flanging of the spacers allows certain parts of the ramps to clear over the spacers to bottom of the cavity while other parts of the ramps engage the flanges to ensure that the ramps align properly with one another in the well. Further the flanges properly seat the ramps and prevent them from moving around within the tailgate.

Since the two sets of members of the ramp assembly are tapered and in the face to face or back to back relation, the four members will stack utilizing approximately the thickness of either the first and fourth members 42, 60 for storage as shown in FIG. 3A. Thus the depth of the well 24 is determined by the thickness of the first or fourth members 42, 60. Once the four members are placed in the well as described, the cover 18 may be closed to secure the members in place. The tailgate 12 may be then used in the convention manner.

In the embodiment illustrated, the four members 42, 50, 58, 60 of the ramp assembly are fabricated from a lightweight metal, such as aluminum. However, it is contemplated that other lightweight, high strength materials, such a long glass fibre reinforced plastic or nano-particle reinforced composite materials, may also be used. The dimensions of the ramp depend upon the load of the articles being transported along the ramps and thus well within the purview of those skilled in the art.

Figure 9:
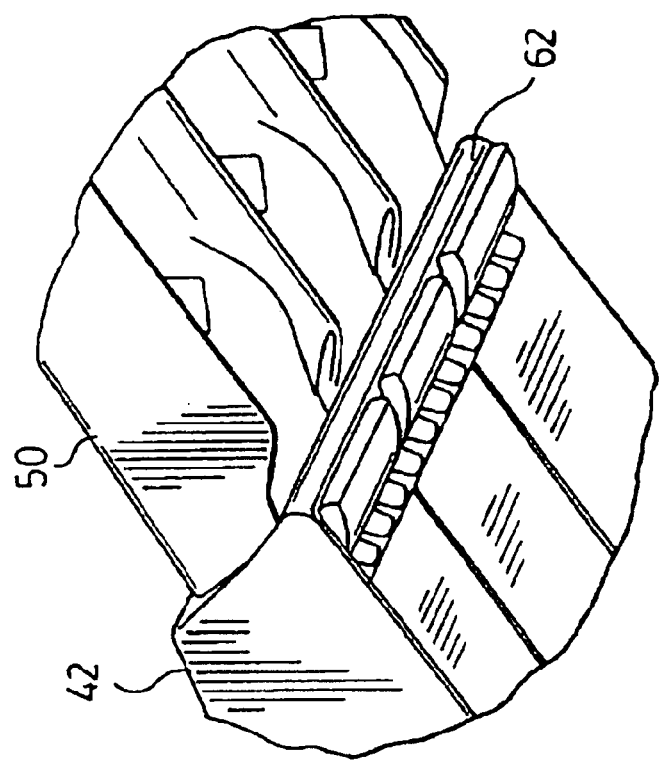
FIG. 9 is a perspective view of the underside of the hinging of the ramp assembly of FIG. 8.
Figure 8:
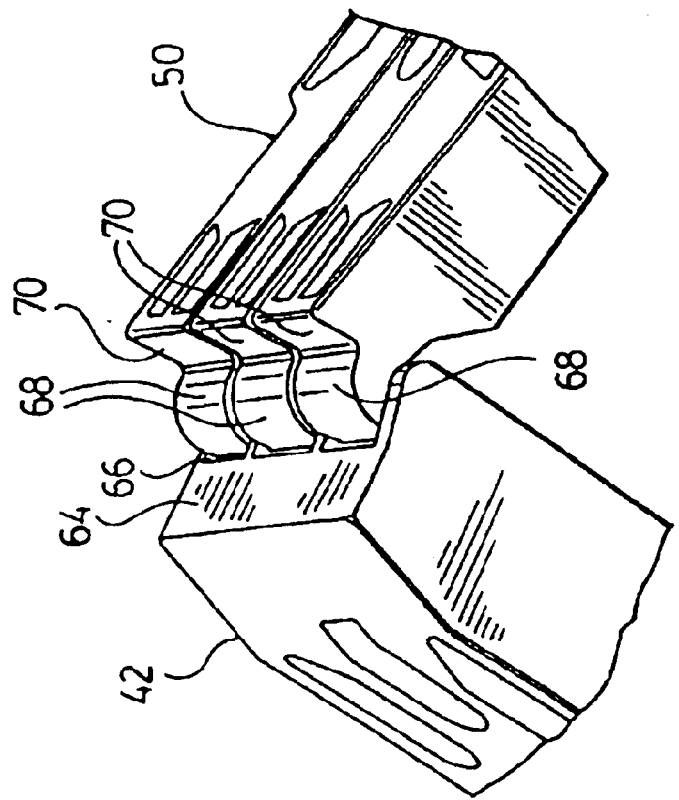
FIG. 8 is perspective view of the hinging between first and second members of the ramp assembly.

Referring to FIGS. 8 and 9, the hinged end of first member 42 and the hooked end of second member 50 is illustrated. The hinged end of the first member 42 has a rod 62 extending from side to side at the lower edge. Rod 62 is connected to each of the ribs 44 and spaced slightly forwardly of the end wall 64. End wall 64 extends downwardly from the support surface only part of the depth of the first member 42, presenting openings 66 between the ribs 44. The openings 66 has cam surface extending about the rod 62.

Second member 50 has a plurality of hooks 68 extending at the lower edge. Above the hooks 68 is an end wall presenting abutment surfaces 70. Each hook 68 extends approximately 180° so that any connection starts when the first and second members 42, 50 are substantially perpendicular to each other. This feature minimizes the risk of accidental disconnection. Additionally, as the second member 50 is rotated relative to the first member 42, the hooks will engage the cam surfaces of opening 66 to encourage positive engagement therebetween. The second member 50 is pivoted about the rod 62 until the abutment surfaces 70 engage the end wall 64.

Figure 10:
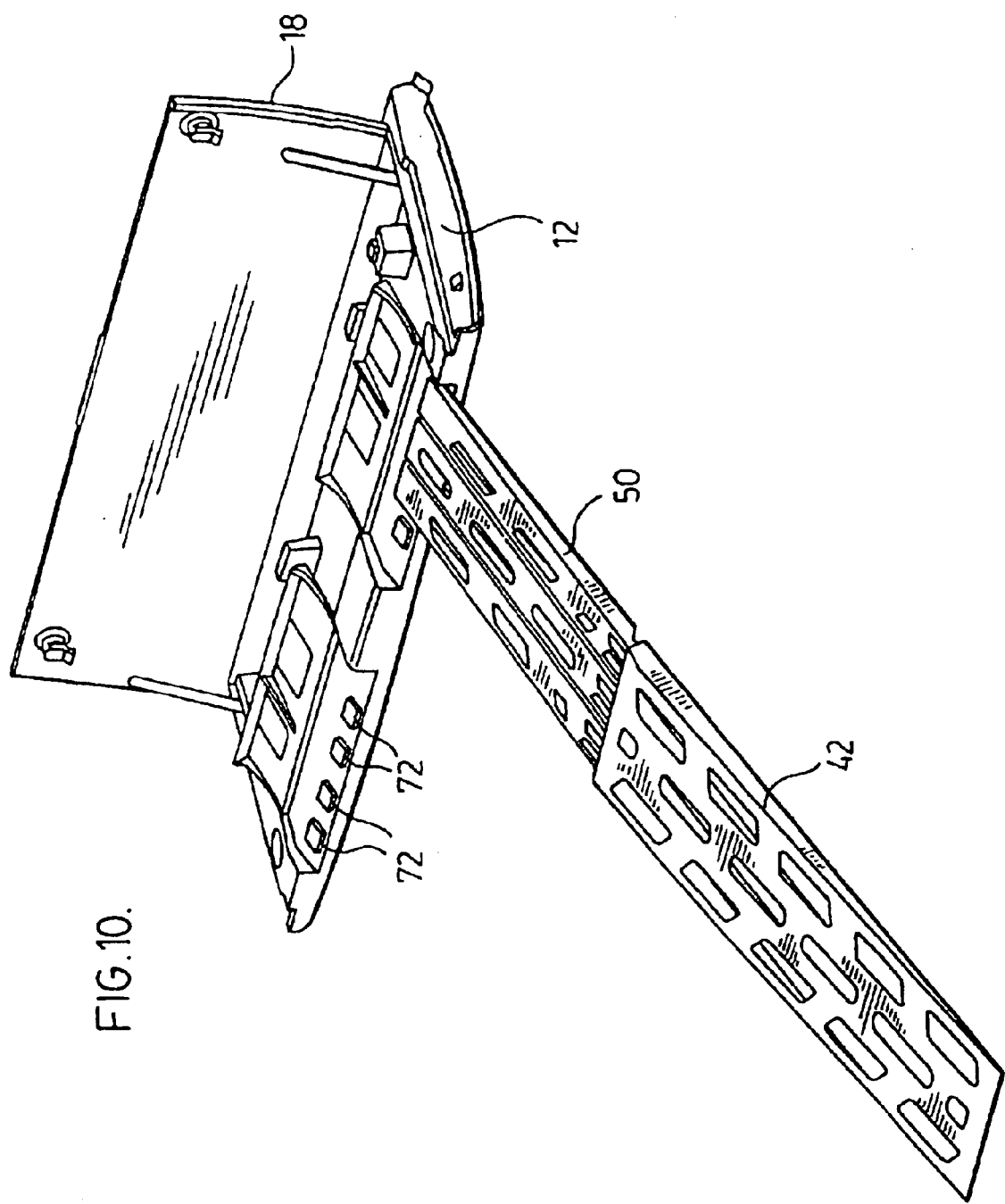
FIG. 10 is perspective view of the ramp assembly and tailgate according to a preferred embodiment of the present invention.
Figure 11:
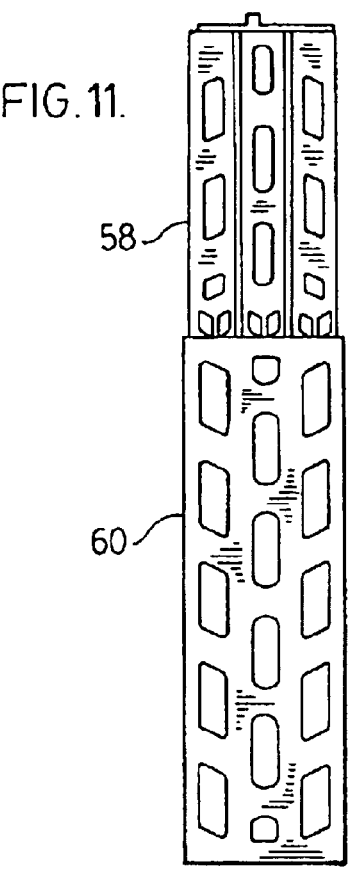
FIG. 11 is a top plan view of the ramp assembly according to the preferred embodiment of the present invention.
Figure 12:
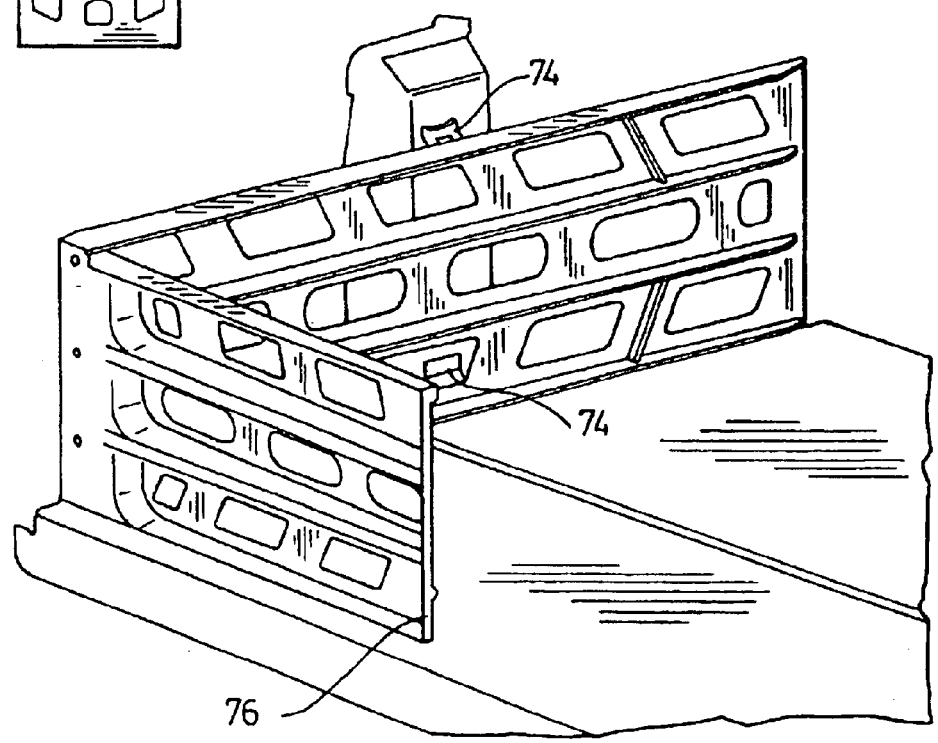
FIG. 12 is perspective view of the ramp assembly of a preferred embodiment of the present invention in a box extender mode.
Figure 13:
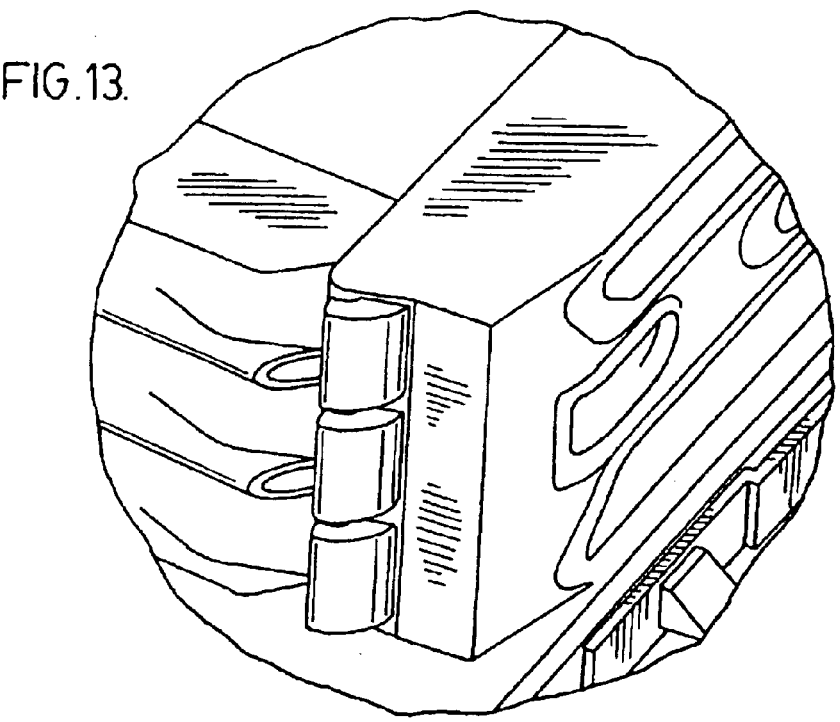
FIG. 13 is a perspective view of a reversed hinging of the ramp assembly of FIG. 12.
Figure 14:
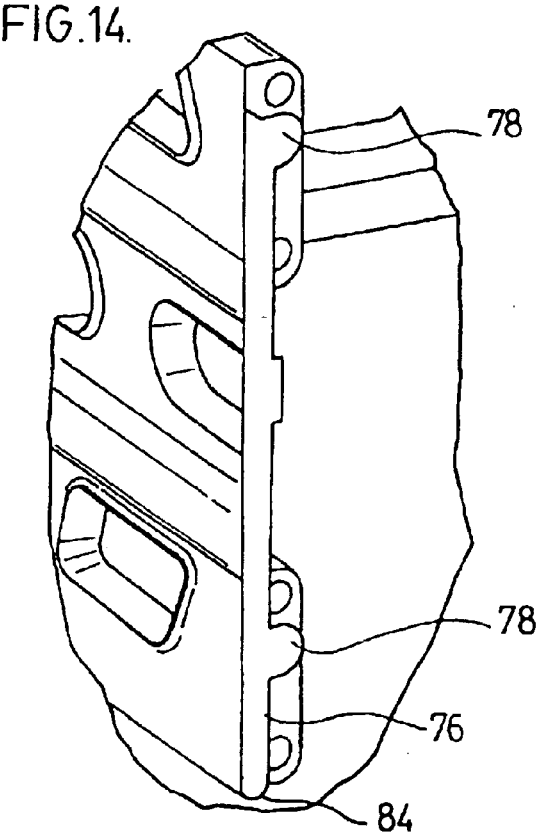
FIG. 14 is a perspective of a slide end of a second member of the ramp assembly.

Referring now to FIG. 10, the ramp assembly is illustrated in the ramp configuration. The first member 42 and the second member 50 are hooked together in the elongated ramp condition. The second member 50 is hooked onto the tailgate 12 with the lip 55 abutting with studs 72 on the upper/trailing edge 34 positioned under the flaps 36. Once the third and fourth members 58, 60 are installed in a similar fashion, the flaps 36 and the cover 18 are closed and the ramp assembly of the present invention are ready for use.

Referring to FIGS. 12–15, the members 42, 50, 58, 60 of the ramp assembly may also be stored or used in a box extending condition. The second member 50 is applied to the first member 42 with one of the two in an inverted condition, the two members will rotate until the second member 50 extends perpendicular to the first member 42. The other two members 58, 60 are connected in a similar fashion. The side walls of the cargo bed are provided with clips 74 which engage and secure the first 42 and fourth 60 members to the side walls.

The lip 55 of the second member 50 is provided with a slidably mounted rod 76 having tabs 78 extending therefrom. Third member 58 has a guide 80 having slots 82. Cover 18 is preferably provided with an aperture 84.

Slide rod 76 interconnects with guide 80 to secure second and third members 50 and 58 together. Rod 76 is inserted into the aperture 84 to secure the ramp assembly in place.

Figure 15:
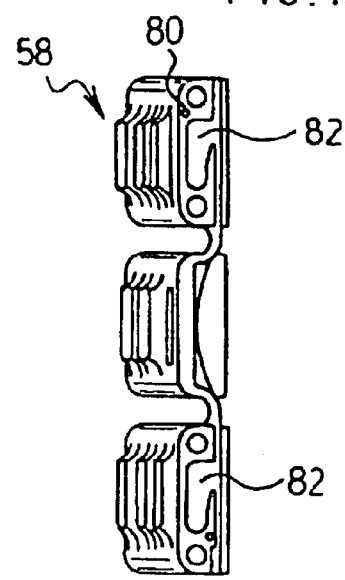
FIG. 15 is a perspective of a locking end of the fourth member of the ramp assembly.
Figure 15A:
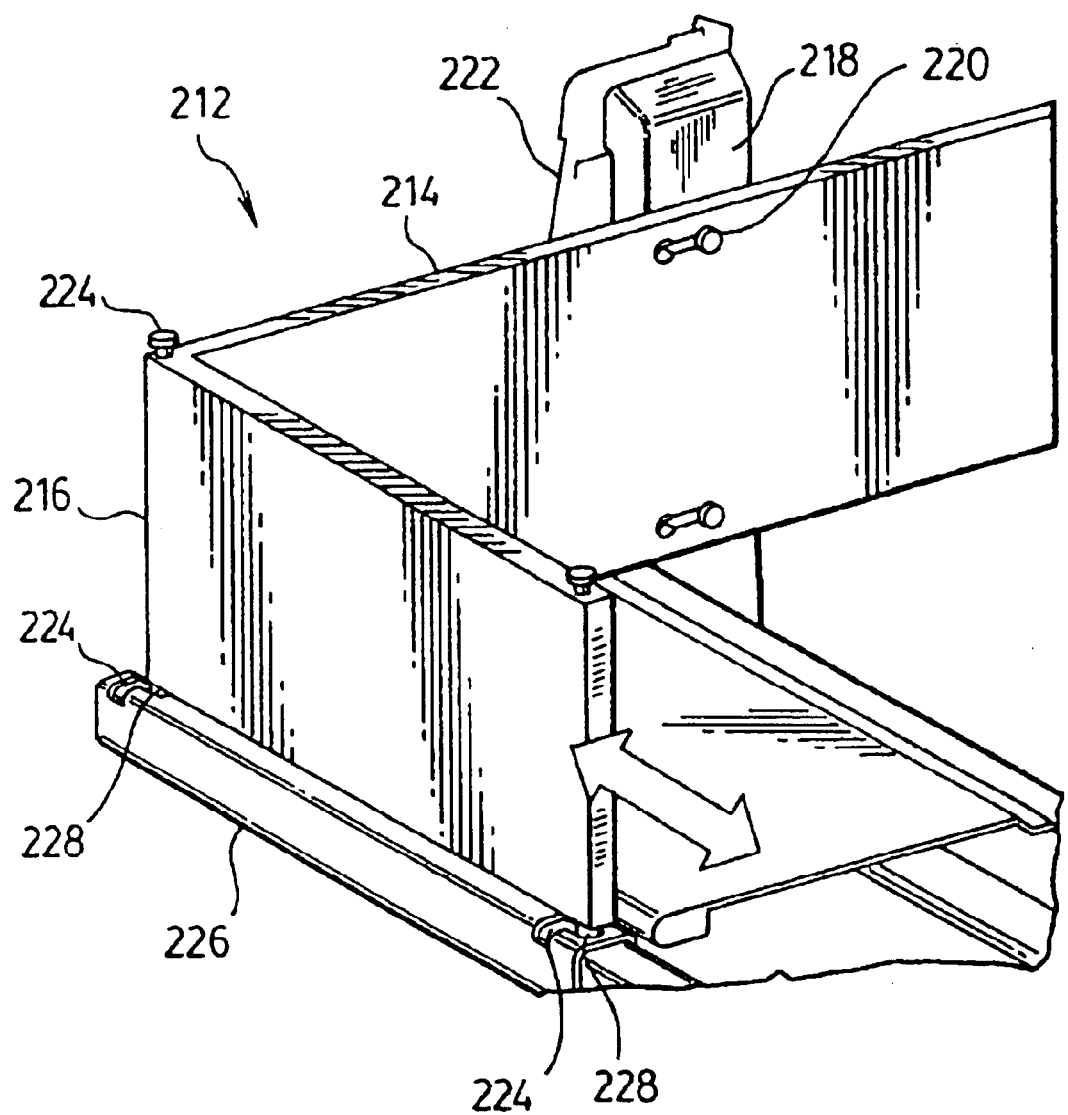
FIG. 15A is a perspective view of a cargo box extender according to another embodiment of the invention.
Figure 18:
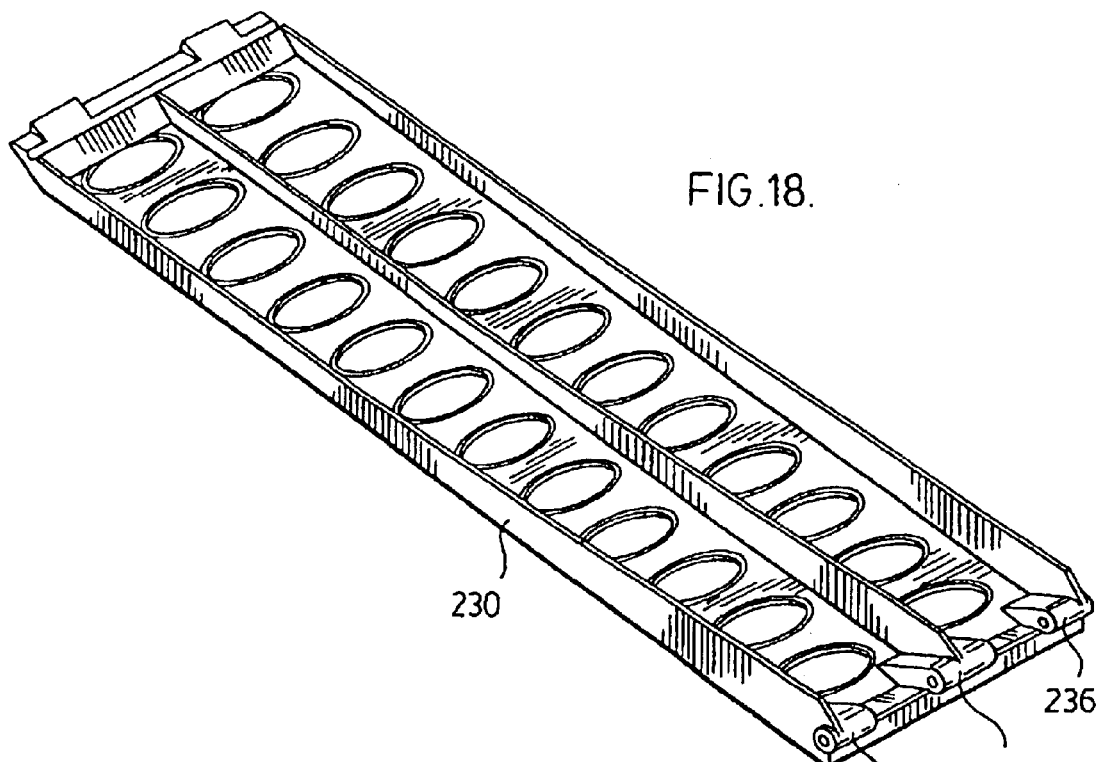
FIG. 18 is a perspective view of the underside of the ramp member of FIG. 16.
Figure 19:
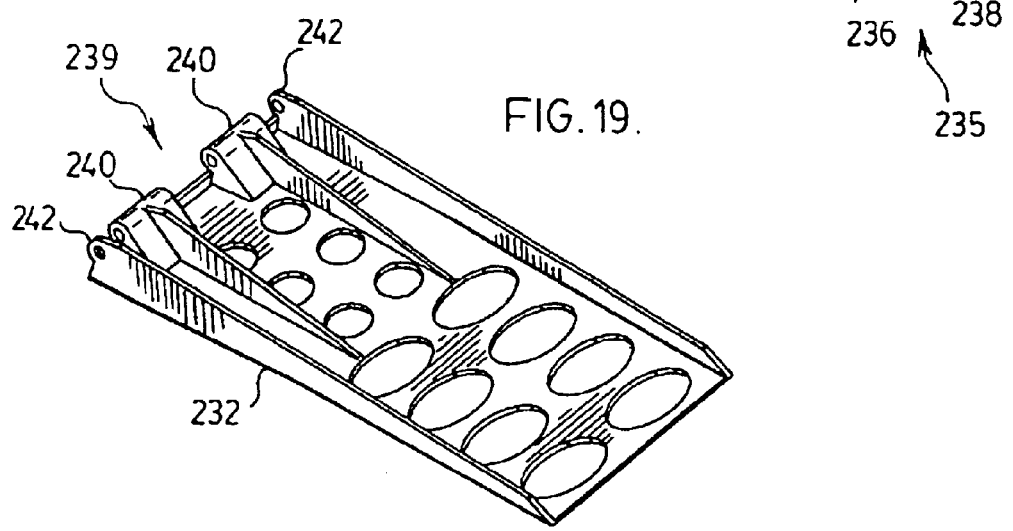
FIG. 19 is a perspective view of the underside of the ramp member of FIG. 17.

FIG. 15A shows another box extender assembly generally indicated at 212. This box extender assembly comprises a pair of panels 214 and 216 and another pair of identical panels (not shown on the figure). These panels could just as easily be stowable ramps similar to those earlier described.

The pillars 218 of the cargo box include undercut pins 220 which lock into undercut slots 222 of panels 214 to hold these panels with the sidewalls of the cargo box.

Panels 214 are hingedly connected to panels 216 so they form a connected right angle as shown in FIG. 15A. Panels 216 include undercut pins 224 at their upper and lower edges so they like the panels 214 are reversible in their direction of positioning. The edge of the tailgate includes undercut openings to receive the downwardly facing pins. It is also reinforced by an edge cover 226 having its own openings 228 which align with the tailgate openings to secure the panels across the back of the cargo box. The two panels 216 will interlock with one another using for example the earlier described slide interlock to hold the assembly together.

FIGS. 16 through 21 show another stowable ramp assembly according to an embodiment of the invention. This ramp assembly comprises a first long ramp 230 and a second shorter ramp 232. Again both of these ramps have a wedge shape.

Ramp 230 includes a ground engaging end 234 which is angled to meet with a support surface without leaving a gap between the surface and the ramp. It also has a connecting end 235 having a pair of outer hollow tubular hinge pin receptors 236 and a centre receptor 238.

Figure 20:
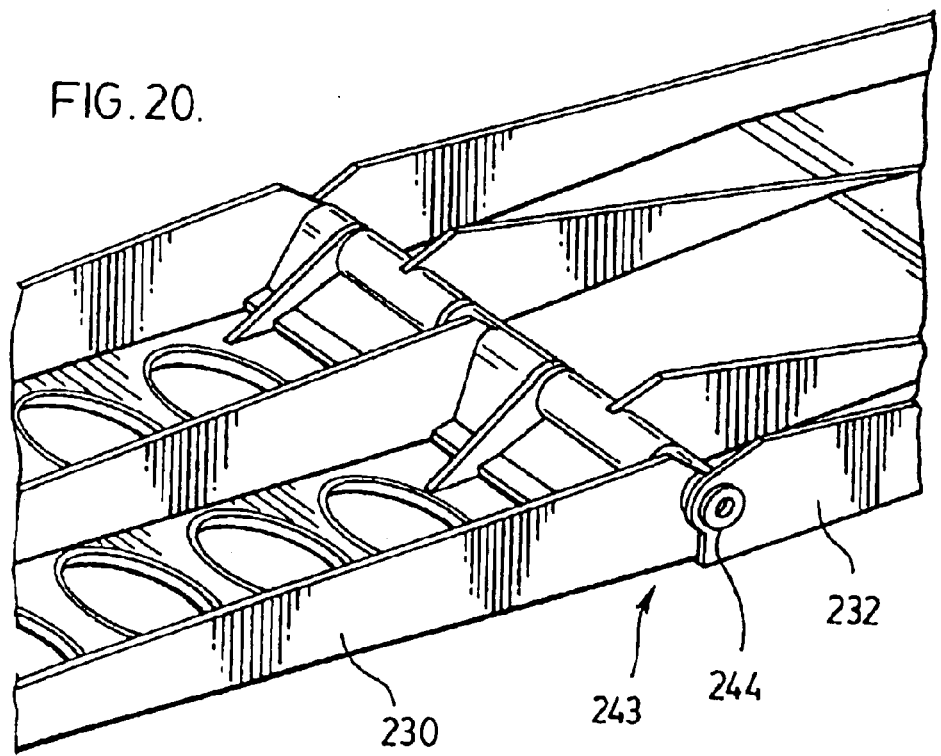
FIG. 20 is an enlarged perspective view from the underside of the joint region of the ramp members of FIGS. 16 and 17.

Ramp 232 has a connector end 239 including pin receptors 240 and 242. These receptors align with the receptors of the longer ramp as shown in FIG. 20 to form a hinged joint 243 between the two ramps. This hinged joint is secured by a hinge pin 244.

Figure 21:
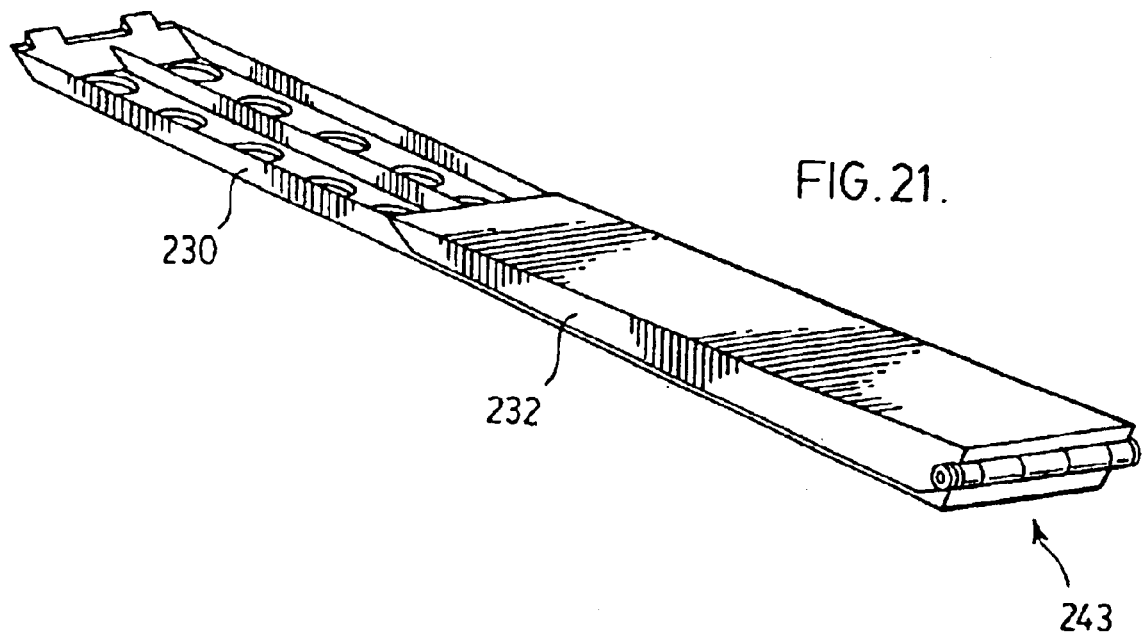
FIG. 21 is a perspective view looking down on the ramp member of FIGS. 16 and 17 when joined with one another and when in a folded condition ready for storage in the vehicle.

In this assembly the two ramps fold from an extended ramp forming position to a collapsed storage position as shown in FIG. 21 with releasing from one another. Once again they are easily stowed in the folded position within a storage well, e.g. the tailgate, of the vehicle. The wedge shaping and the long and short lengths of the ramp members enables them to readily nest with another pair of similar ramp members.

The present invention thus far has been described in terms of two ramp members to each side of the vehicle. However, it is now readily apparent to those skilled in the art that each ramp structure could be assembled with more than two members interconnected together with a series of hooks and hinges at opposite ends of intermediate members. The additional members could also be configured to nest for storage in the manner described above.

Further, the present invention has been described above with the storage well being integrated within a pick-up truck tailgate. It is now readily apparent to those skilled in the art that the storage well could be integrated in any suitable location on the vehicle including on the floor of the cargo bed. Additionally, the present invention could also be utilized with other types of vehicles.

Furthermore, it should be noted that even though in the description above the tailgate liner has been specifically configured to receive cargo ramps, this liner, as evident from FIG. 3A, can easily be replaced with a different liner configured for a different use. For example the tailgate can be used to receive fishing and/or hunting gear. The liner would have defined receiving areas for locking this gear in place in the tailgate.

Note that the items described above are not large enough to justify a complete coverage of the cargo box. However, when using the tailgate these items are stored in an orderly manner and can be locked within the tailgate. The tailgate itself can be easily made weatherproof while leaving the cargo box available for transporting much larger items which do not need weather protection.

Figure 22:
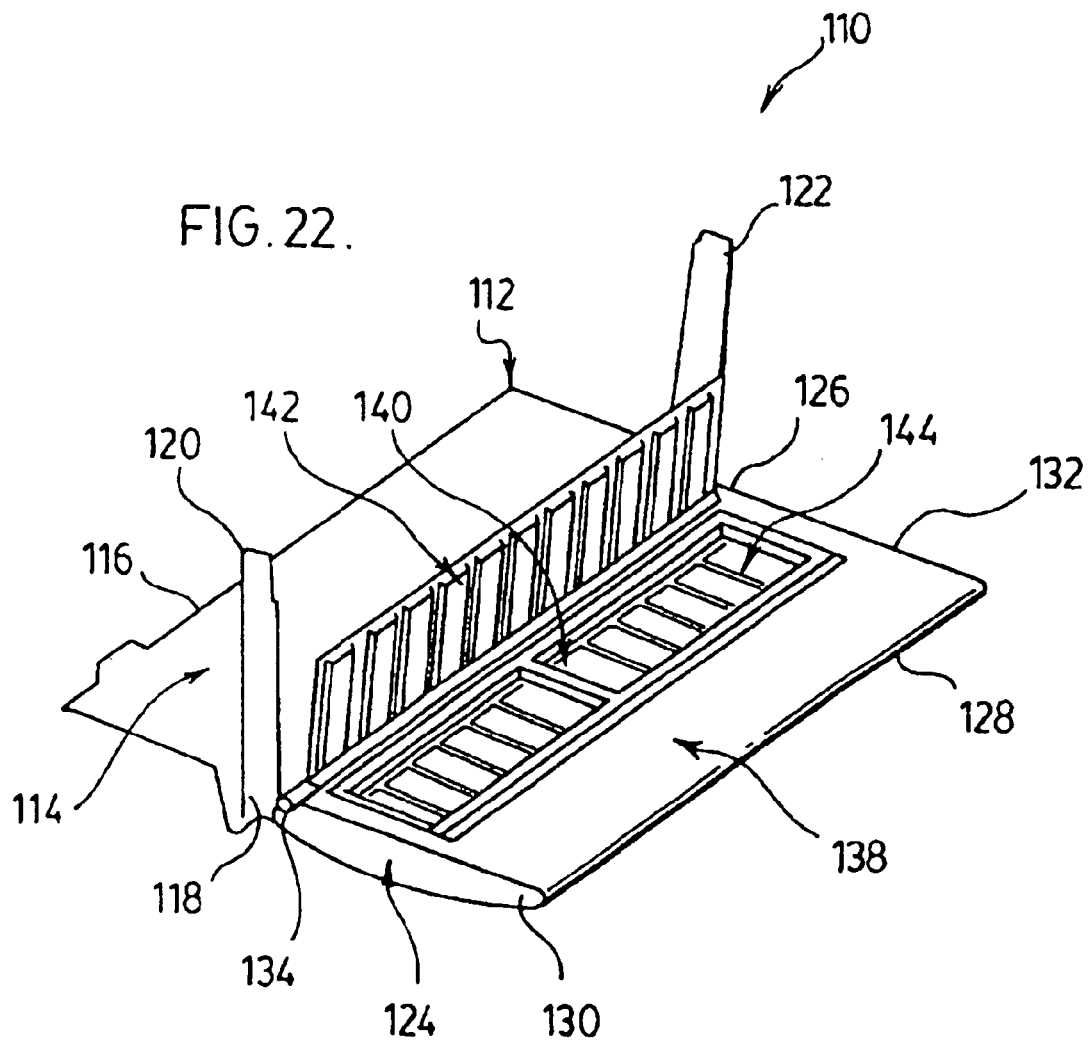
FIG. 22 is a perspective view of a cargo box of an automotive vehicle having a tailgate and plurality of extension ramps stowed within the tailgate according to another embodiment of the present invention.

According to another embodiment of the invention a portion of an automotive vehicle, such as a pick-up truck, is generally depicted at 110 in FIG. 22 for storing and transporting various articles of cargo. Alternatively, the vehicle may be a sport utility vehicle, mini-van, full sized van, or other commonly known vehicle adapted for storing and transporting cargo. The vehicle 110 includes a cargo box 112 for supporting, containing and storing the cargo in the vehicle during transportation. The cargo box 112 includes a generally rectangular and planar cargo floor 114 extending between a front end 116 and a rear open end 118 and a pair of spaced apart, opposing, and generally parallel side walls, illustrated at 20 and 22, extending between the front end 116 and the rear open end 118 along opposing sides of the cargo floor 114.

An elongated, generally rectangular tailgate 124 is operatively connected to the rear open end 118 of the cargo floor 114 and pivotal between an open position, as shown in FIG. 22, extending from the cargo floor 114 and generally planar therewith for providing access to the cargo box 112 and a closed position extending generally upright from the rear open end 118 of the cargo floor 114 between the opposing side walls 120, 122 for closing the cargo box 112, as is commonly known in the art. The tailgate 124 includes a forward end 126 pivotally attached to the rear open end 118 of the cargo floor 114 and a rearward end 128 spaced opposite the forward end 126. The tailgate 124 further includes first and second ends 130, 132 extending between the opposing side walls 120, 122 in the closed position. The tailgate 124 is pivotally connected to either the cargo floor 114, such as by a piano-type hinge, or to the opposing side walls 120, 122, such as by a pivot rod 134 extending from the ends 130, 132 adjacent the forward end 126 and lockable to the cargo box 112 by a latch mechanism 136, as is commonly known in the art. The tailgate 124 comprises a top surface 138 forming an extended planar support surface with the cargo floor 114 when the tailgate is in the open position and a bottom surface 139 facing opposite the top surface 138. Alternatively, the vehicle 110 may include a single rear door or a pair of swinging rear doors pivotally connected to the opposing side walls 120, 122 adjacent the rear open end 118 for opening and closing the cargo box 112, such as is commonly known in sport utility vehicles.

Figure 23:
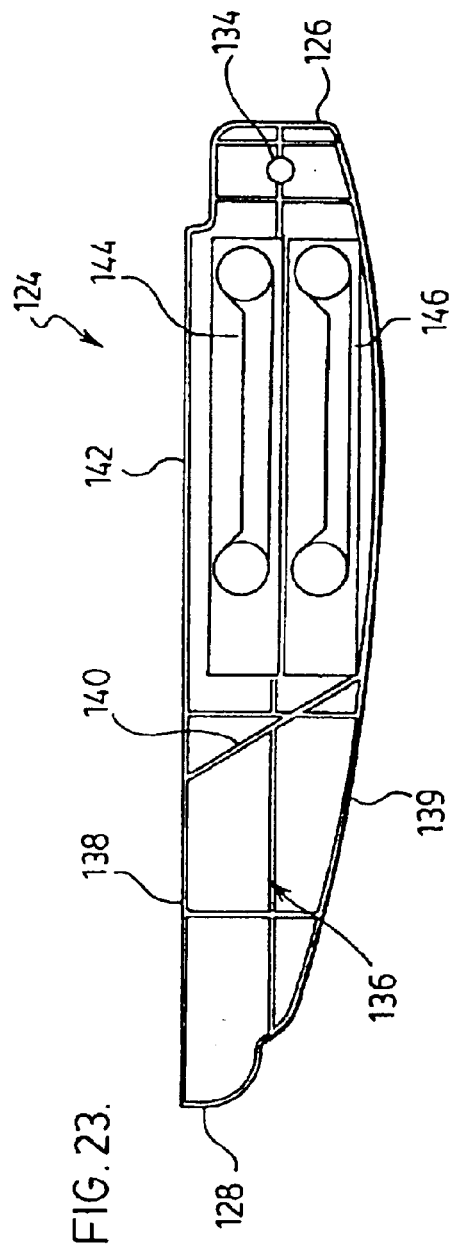
FIG. 23 is a cross sectional side view of the extension ramps of FIG. 22 stowed within a cavity of the tailgate of FIG. 22.
Figure 24:
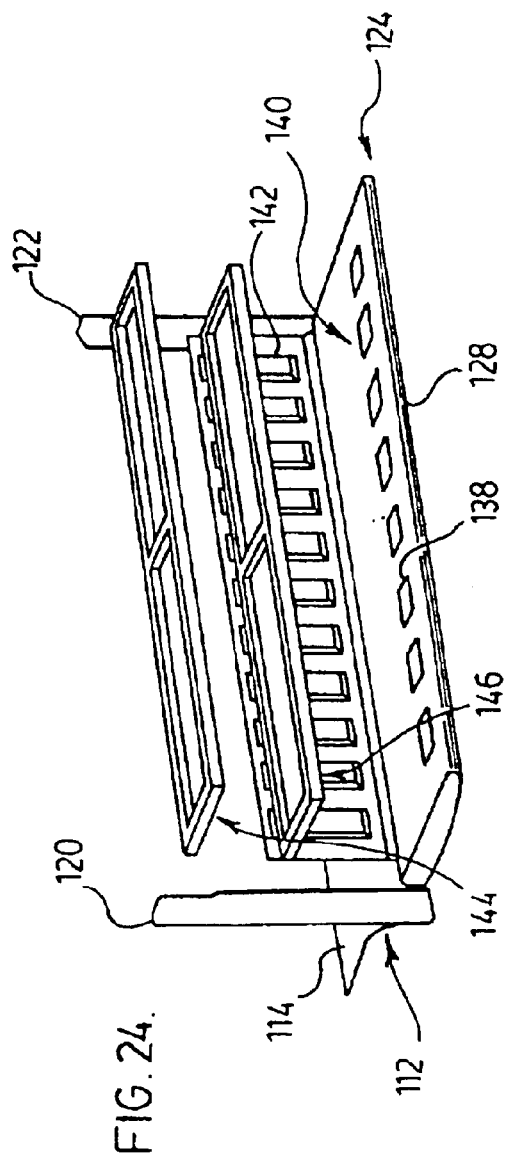
FIG. 24 is a perspective view of the extension ramps removed from the cavity of the tailgate of FIG. 22.
Figure 25:
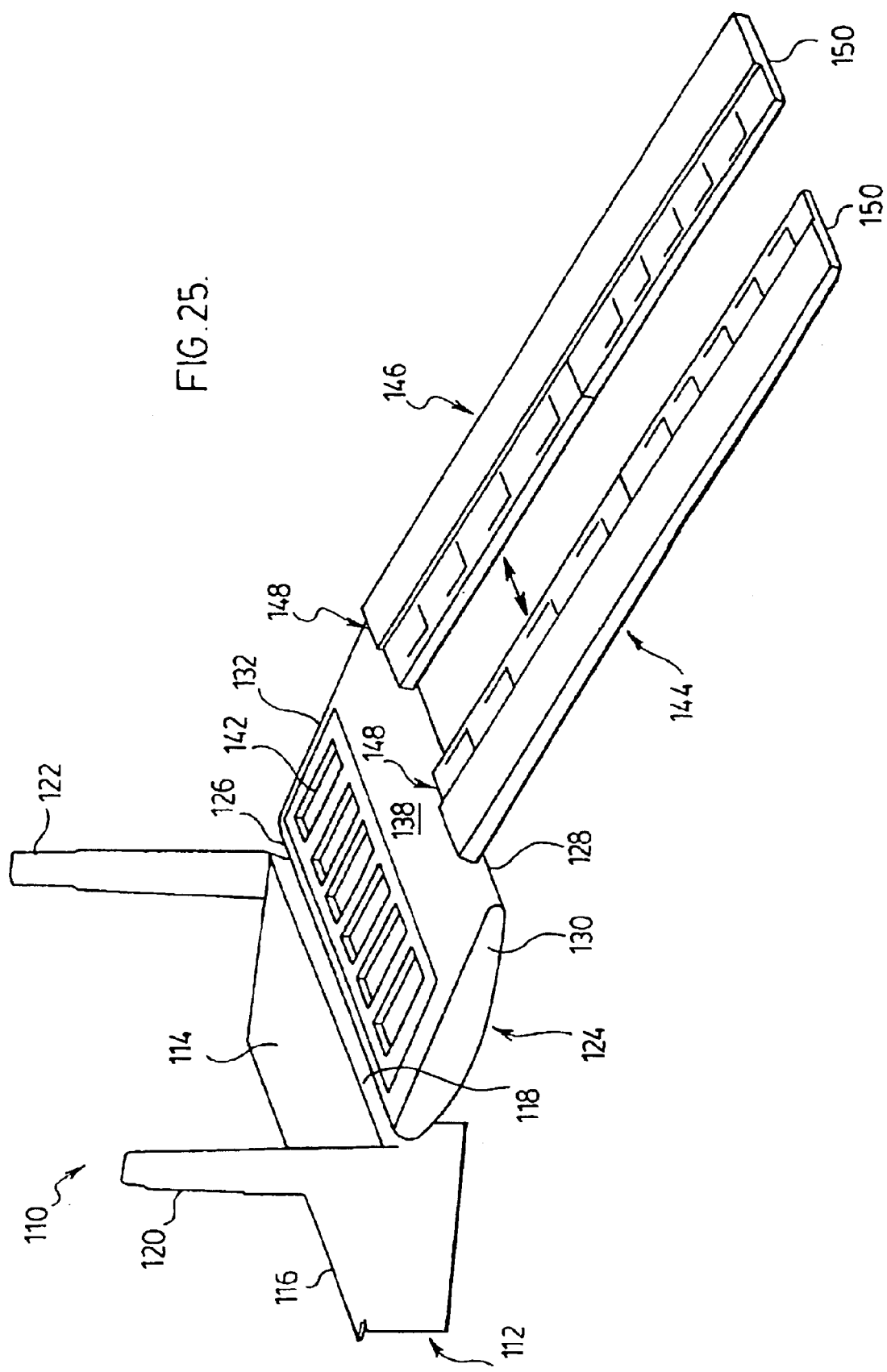
FIG. 25 is a perspective view of a pair of parallel extension ramps operatively connected to the tailgate forming a double extension ramp for use in loading cargo into the cargo box of the vehicle of FIG. 22 according to another aspect of the invention.

Referring to FIGS. 22, 23 and 24, the tailgate 124 includes a generally rectangular cavity 140 recessed from an opening in the top surface 38 of the tailgate 124 extending between the first and second ends 130, 132 and at least partially between the forward end 126 and rearward end 128. The cavity 140 forms a storage compartment within the tailgate 124. Alternatively, the cavity 140 may extend into the tailgate 124 from an opening in one, or both, of the first and second ends 130, 132. The tailgate 124 further includes a door 142 for closing the opening or cavity 140. The door 142 is pivotally attached to the top surface 38 of the tailgate 124 by a piano-type hinge or other pivot mechanism and pivotal between an open position, as shown in FIG. 22, providing access to the cavity 140 and a closed position, as shown in FIG. 25, covering the opening of the cavity 140 and aligned flush with the planar top surface 138 of the tailgate 124. The door 142 includes a latch for releasably locking the door 142 to the top surface 138 of the tailgate 124 in the closed position. Alternatively, the tailgate 124 may include a door 142 pivotally connected to one, or both, of the ends 132, 134 for closing an opening therein to open and close the cavity 140.

The vehicle 110 further includes at least one elongate extension ramp 144 which is stowable within the cavity 140, as shown in FIG. 22. The extension ramp 144 is defined by an elongated, generally rectangular, plate which may be formed from aluminum, steel, plastic, composites, or other rigid like material and have a solid or mesh outer skin. The extension ramp 144 is dimensioned to be seated and stowed within the cavity 140 in the tailgate 124. The cavity 140 may store one or more extension ramps 144, 146, as shown in FIG. 24, in overlying relationship.

Referring to FIG. 25, each extension ramp 144, 146 includes a first end 148 for connecting the ramps 144, 146 to the rearward end 128 of the tailgate 124 in the open position. The first end 148 comprises a positive latching mechanism, such as a hook which may be received and engaged with a slot in the tailgate 124, to secure the ramps 144, 146 to the tailgate 124 in the extended and opened position. The ramps 144, 146 also include a second end 150 for supporting the ramps 144, 146 on a surface adjacent the vehicle 110 whereby the ramps 144, 146 provide a gradual inclined and extended support surface between the tailgate 124 and the surface adjacent the vehicle 110 for loading cargo into the cargo box 112. That is, the surface adjacent the vehicle 110 is typically the road or surface supporting the vehicle 110. The tailgate 124 is spaced vertically above the road or surface supporting the vehicle 110 due to the height of the vehicle's wheel, frame and suspension. The ramps 144, 146 provide an extended inclined ramp from the rearward end 128 of the tailgate 124 to the road or surface supporting the vehicle 110. Alternatively, the ramps 144, 146 may also extend between the tailgate 124 and another surface adjacent the vehicle 110 such as a building, loading dock platform or other support surface.

Also shown in FIG. 25, the pair of extension ramps 144, 146 are spaced apart and aligned parallel to one another and as should be appreciated, the spacing between the ramps 144, 146 may varying by connection of the ramps 144, 146 to the tailgate 124 at various locations between the first and second ends 130, 132. The parallel spacing of the ramps 144, 146 allows for loading of small and various sized four wheeled vehicles, such as ATVs, tractors, carts, or the like, by driving the vehicles up the ramps 144, 146 and onto the cargo floor 114.

Figure 26:
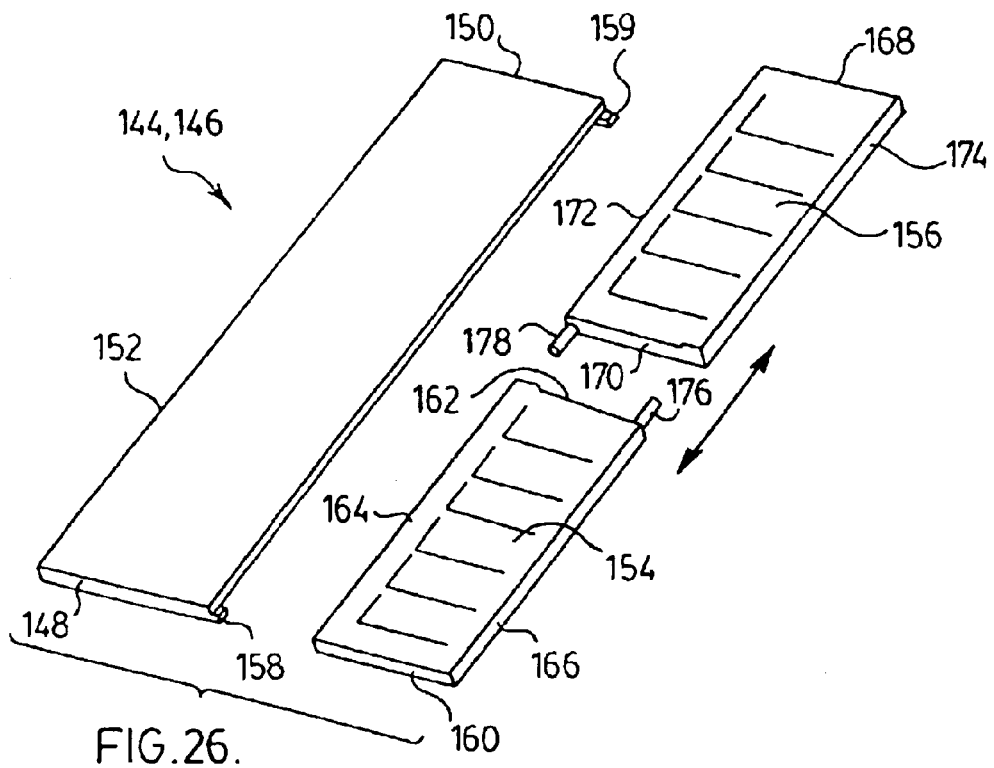
FIG. 26 is an exploded view of an extension ramp according to yet another preferred embodiment of the invention.
Figure 27:
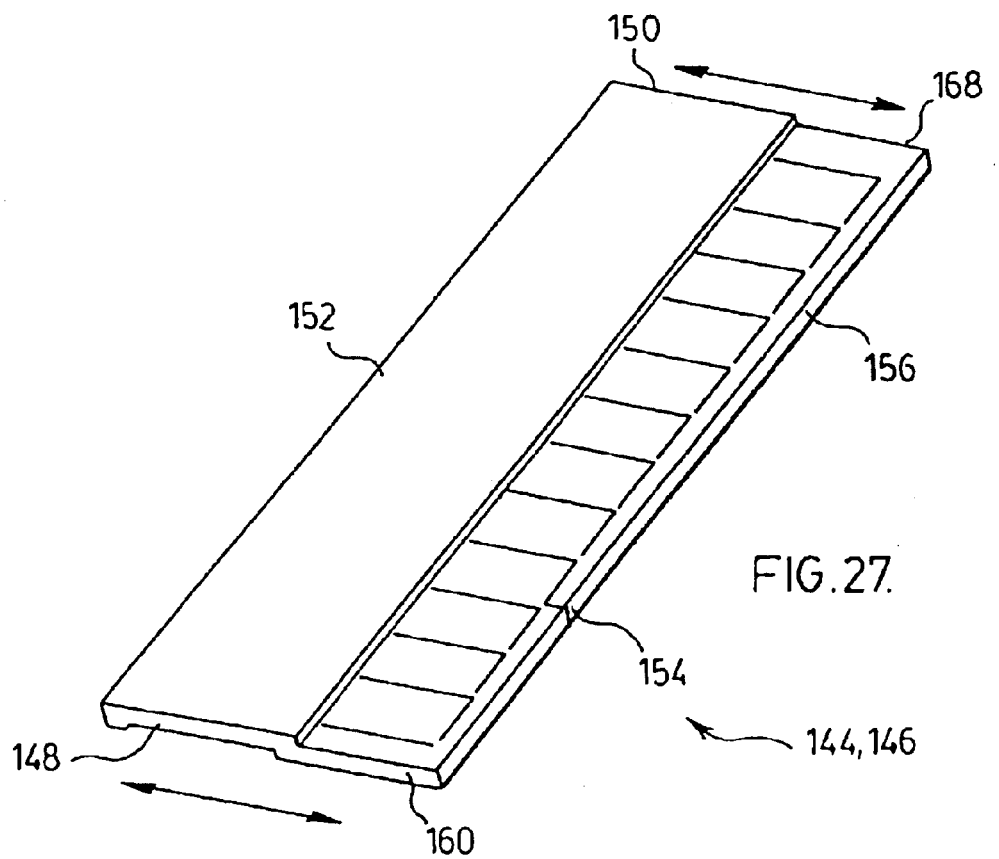
FIG. 27 is a perspective view of an extension ramp expanded laterally to increase the width of the ramp according to another preferred embodiment of the invention.

Referring now to FIGS. 26 and 27, each extension ramp 144, 146 is comprised of three removable ramp sections 152, 154, 156 which may be interconnected to form an adjustable extension ramp 144, 146. More specifically, each extension ramp 144, 146 includes a first ramp section 152 extending longitudinally between the first and second ends 148, 150. The first ramp section 152 includes a guide rod 158, 159 connected to each of the respective ends 148, 150 for slidably receiving the other ramp sections 154, 156. Each extension ramp 144, 146 further includes a second ramp section 154 and a third ramp section 156, which when aligned longitudinally, extend between the first and second ends 148, 150. The second ramp 154 includes a first end 60 forming an open, tubular, guide sleeve for receiving the guide rod 158 of the first ramp section 152 to slidably interconnect the first 152 and second 154 ramp sections along a direction transverse to the longitudinal axis defined between the first and second ends 148, 150. The second ramp section 154 further includes a second distal end 162 opposite the first end 160 and spaced apart, opposing, side rails 164, 166 extending between the first 160 and second 162 ends. The side rails 164, 166 also form open, tubular guide sleeves. Similarly, the third ramp section 156 includes a first end 168 forming an open, tubular guide sleeve for receiving the guide rod 159 of the first ramp section 152 to slidably interconnect the first 152 and third 156 ramp sections along a direction transverse to the longitudinal axis defined between the first and second ends 148, 150. The third ramp section 156 also includes a second distal end 170 opposite the first end 160 and spaced apart, opposing, side rails 172, 174 extending between the first 68 and second 170 ends. The side rails 172, 174 similarly form open, tubular guide sleeves. A pair of tubular connected rods 176, 178 are received in the guide sleeves defined by the side rails 164, 166, 172, 174 and extend therebetween to interconnect the second ends 162, 170 of the second 154 and third 156 ramp sections longitudinally between the first ends 160, 168. Alternatively, the connecting rods 176, 178 may be fixedly secured to one of the open ends of the guide sleeves formed by the side rails 166 and 172 to receive by the opposing side rail 166, 174, as shown in FIG. 26.

As illustrated in FIG. 27, the second and third ramp sections 154, 156 may be interconnected longitudinally and slidably connected by the guide rods 158, 159 to the first ramp sections 152 providing an adjustable width extension ramp 144, 146.

Figure 28:
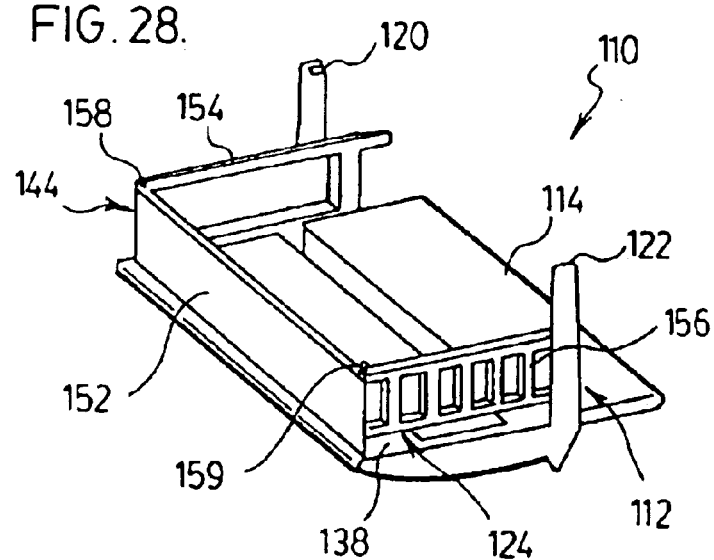
FIG. 28 is a perspective view of an extension ramp operatively connected to the cargo box and tailgate in an upright position forming an extension to the cargo box according to still another embodiment of the invention.
Figure 29:
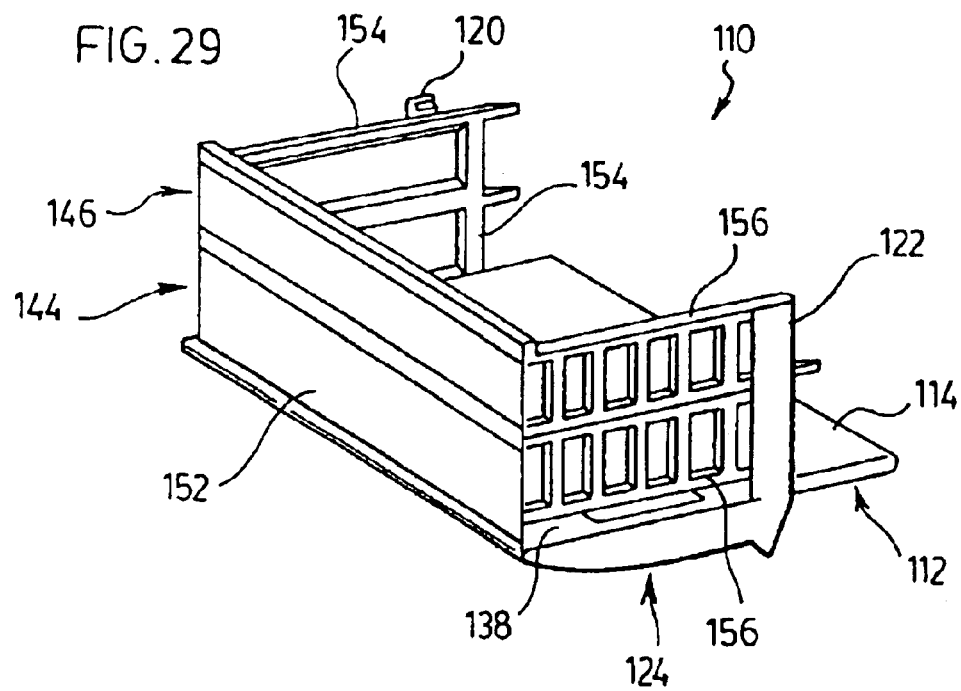
FIG. 29 is a perspective view of a plurality of extension ramps operatively connected to the cargo box and tailgate in the upright position forming an extension of the cargo box according to yet another embodiment of the invention.

Referring to FIGS. 28 and 29, one or more of the extension ramps 144, 146 may also be arranged and connected to the cargo floor 114 and tailgate 124 in the open position to form an extended, increased capacity cargo box 112 on the vehicle 110. FIG. 28 discloses one extension ramp 144 connected to the cargo box 112 and tailgate 124 wherein the first ramp section 152 is connected in an upright position to the top surface 138 of the tailgate 124 and the second 154 and third 156 sections connected between the first ramp section 152 by the guide rods 158, 159 and to the opposing side walls 120, 122 of the cargo box 112. FIG. 29 discloses both of the extension ramps 144, 146 connected to the cargo box 112 and tailgate 124 wherein the first ramp section 152 of each extension ramp 144, 146 is connected in a stacked upright position to the top surface 138 of the tailgate and the second 154 and third 156 ramp sections are connected in a stacked upright position between the opposing ends of the first ramp sections 152 and the opposing side walls 120, 122 to increase the height and load capacity of the cargo box 112.

Figure 30:
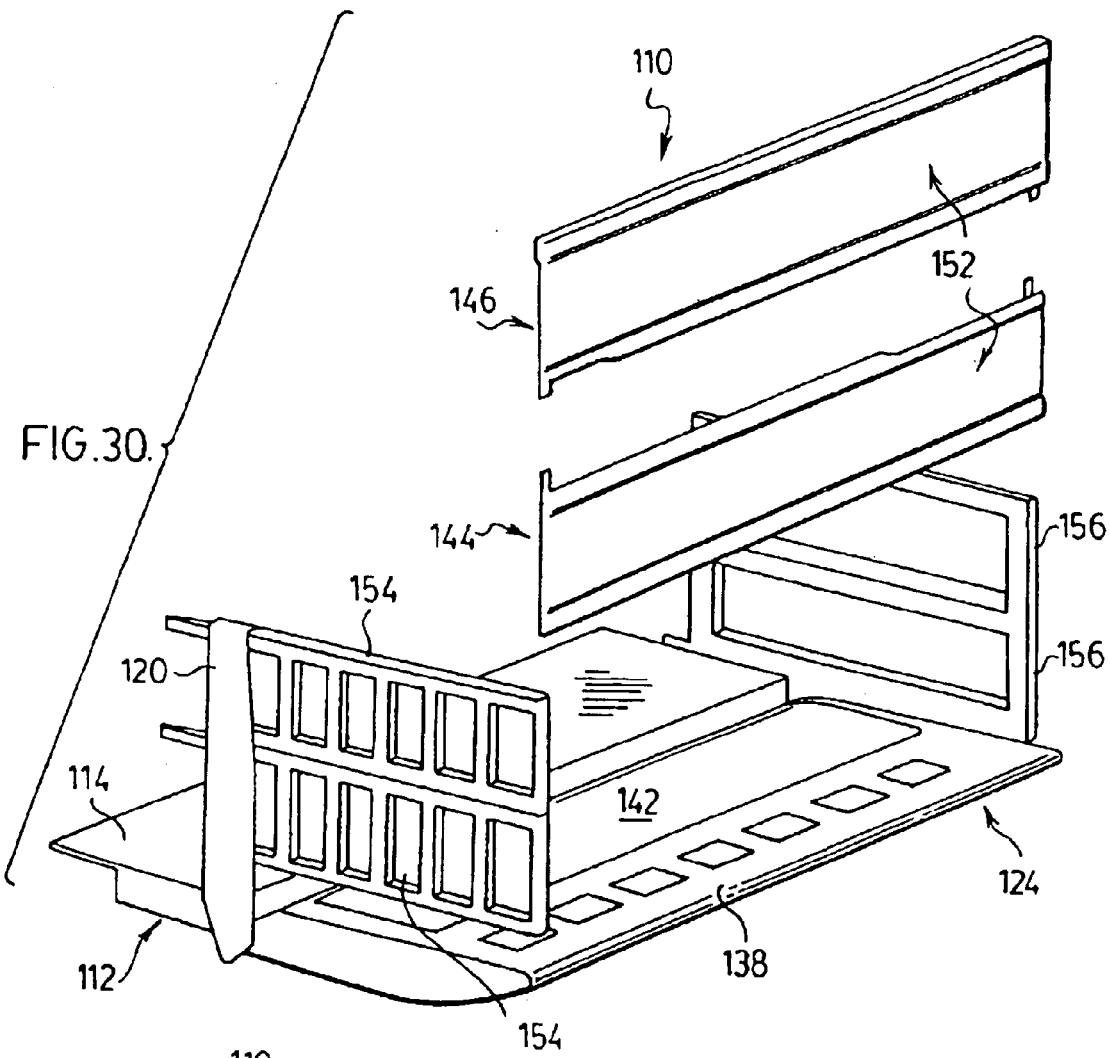
FIG. 30 is a partially exploded view of FIG. 29 with a pair of the extension ramps shown removed from the tailgate to provide access to the cargo box.

FIG. 30 discloses the first ramp sections 152 of the extension ramps 144, 146 being removed from the tailgate 124 to provide access to the cargo box 112, cargo floor 114 and top surface 138 of the tailgate 124 between the side walls 120, 122 and the stacked ramp sections 154, 156.

Figure 31:
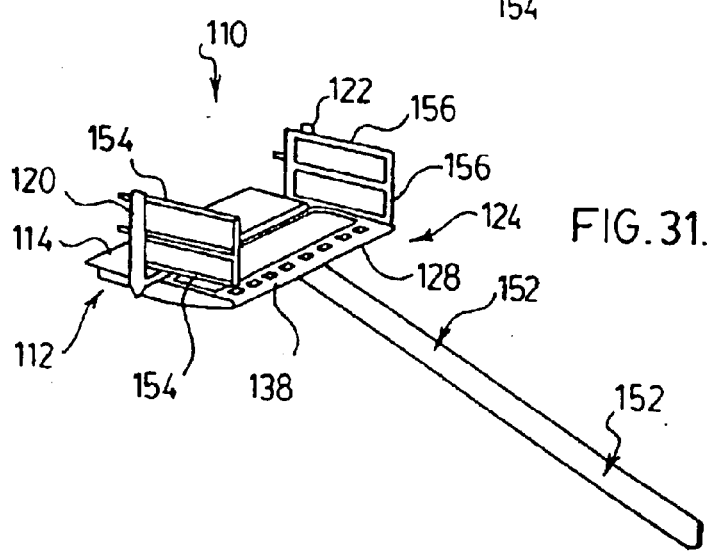
FIG. 31 is perspective view of a pair of extension ramps interconnected longitudinally to the tailgate forming a single extension ramp for use in loading cargo into the cargo box.

Finally, FIG. 31 discloses the first ramp sections 152 of the extension ramps 144, 146 removed from connection to the tailgate 124 to open the extended cargo box 112 and then further attached to the rearward end 128 of the tailgate 124. The sections 152 may be attached to the tailgate 124 in spaced apart parallel relationship or interconnected longitudinally as shown in FIG. 31 extending between the tailgate 124 and the surface supporting the vehicle 110 to provide an extra long and extended single ramp suitable for loading one or two wheeled vehicles such as, motorcycles, bikes, wheelbarrows, or the like, into the cargo box.

Therefore, the extension ramps 144, 146 provide a modular design for providing a wide variety of connection arrangement to the tailgate 124 for use in loading items into the cargo box 112 through a parallel ramp arrangements, varying width arrangement or single extended ramp arrangement. Additionally, the modular design of the ramps 144, 146 allow connection to the tailgate 124 and side walls 120, 122 in order to extend and increase the cargo capacity of the cargo box 112.

The present invention has been described in an illustrative manner. It is to be understood that the terminology which has been used is intended to be in the nature of words of description rather than of limitation.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A stowable ramp assembly for a vehicle comprising:
    a first member having a first support surface and a wedge shaped profile, said first member having a leading end having an end wall extending from said first support surface and a pin extending transversely of the first member, said pin spaced from said first support surface; and
    a second member having a second support surface and a wedge shaped profile, said second member configured to nest within said first member in a front to back relation, said second member having a trailing end having an end wall extending from said second support surface and a hook extending longitudinally from said trailing end at a point spaced from said second support surface, said first and second members interconnecting in a ramp configuration by engaging said hook about said pin and rotating one of said members relative to the other of said members until said leading end wall abuts said trailing end wall presenting an elongated support surface.

2. A stowable ramp assembly as claimed in claim 1, wherein said first and second members interconnect in box extending configuration by engaging said hook about said pin where one of said members is inverted relative to the other of said members and then rotating one of said members relative to the other of said members until said trailing end wall abuts said first member in an L-shape.

3. A stowable ramp assembly as claimed in claim 1, in combination with a vehicle having a storage well and a cover for selectively covering and closing said well, said well sized to receive a first set of said first and second members in a nested configuration and a second set of said first and second members in a nested configuration, said first set and said second set being presented to each other in opposing directions when stowed within said well.

4. A stowable ramp assembly as claimed in claim 2, wherein each of said first and second members have a series of apertures which align when in said nested configuration.

5. A stowable ramp assembly as claimed in claim 4, wherein said well has a series of studs extending through said apertures.

6. A stowable ramp assembly as claimed in claim 2, wherein said well has a first stud extending through one of said apertures of said first set of members and a second stud supporting said second set of members spacing said second set of members from said first set of members.

7. A stowable ramp assembly as claimed in claim 6, wherein said storage well is integrated with a tailgate of said vehicle.

8. A stowable ramp assembly as claimed in claim 6, wherein said storage well is integrated in a floor of a cargo bed of said vehicle.

* * * * *